United States Patent
Takayanagi et al.

(10) Patent No.: US 11,077,847 B2
(45) Date of Patent: Aug. 3, 2021

(54) MOVING BODY

(71) Applicant: AISIN SEIKI KABUSHIKI KAISHA, Kariya (JP)

(72) Inventors: Wataru Takayanagi, Toyohashi (JP); Mitsuhiro Ando, Toyohashi (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 197 days.

(21) Appl. No.: 16/164,345

(22) Filed: Oct. 18, 2018

(65) Prior Publication Data
US 2019/0126918 A1 May 2, 2019

(30) Foreign Application Priority Data
Oct. 26, 2017 (JP) .............................. JP2017-207110

(51) Int. Cl.
| | |
|---|---|
| *B60W 30/095* | (2012.01) |
| *B60W 30/09* | (2012.01) |
| *B60W 50/14* | (2020.01) |
| *G05D 1/02* | (2020.01) |

(52) U.S. Cl.
CPC .......... *B60W 30/095* (2013.01); *B60W 30/09* (2013.01); *B60W 50/14* (2013.01); *G05D 1/0214* (2013.01); *B60W 2050/146* (2013.01); *B60W 2520/06* (2013.01); *B60W 2520/10* (2013.01); *B60W 2520/105* (2013.01); *B60W 2530/10* (2013.01); *B60W 2552/00* (2020.02)

(58) Field of Classification Search
CPC ............................ B60W 30/095; B60W 30/09
See application file for complete search history.

(56) References Cited

U.S. PATENT DOCUMENTS

| | | | | |
|---|---|---|---|---|
| 6,539,294 B1 * | 3/2003 | Kageyama | ............... | E02F 3/842 180/168 |
| 10,059,004 B2 * | 8/2018 | Inaba | ..................... | G05D 1/024 |
| 2006/0212222 A1 * | 9/2006 | Miyoshi | ................... | G08G 1/16 701/301 |

(Continued)

FOREIGN PATENT DOCUMENTS

| | | | |
|---|---|---|---|
| DE | 102012004198 | * | 10/2012 |
| JP | 2011-218075 | | 11/2011 |

OTHER PUBLICATIONS

DE102012004198 machine translation (Year: 2012).*

*Primary Examiner* — Anne Marie Antonucci
*Assistant Examiner* — Abdalla A Khaled
(74) *Attorney, Agent, or Firm* — Finnegan, Henderson, Farabow, Garrett & Dunner, LLP

(57) ABSTRACT

A moving body includes: a first detection unit configured to detect three-dimensional information on a space in which the moving body travels; a second detection unit configured to detect a state of the moving body; and a control unit configured to predict a possibility of overturning of a virtual moving body by allowing the virtual moving body corresponding to the moving body to travel on a virtual road surface in a virtual space prior to a travel of the moving body on a road surface based on a shape of the virtual road surface in the virtual space corresponding to the detected three-dimensional information and based on the detected state of the moving body, and performs control depending on the predicted possibility of overturning.

16 Claims, 22 Drawing Sheets

(56) References Cited

U.S. PATENT DOCUMENTS

| | | | |
|---|---|---|---|
| 2010/0063682 A1* | 3/2010 | Akaki | B66F 17/003 |
| | | | 701/42 |
| 2014/0156178 A1* | 6/2014 | Yoo | G01C 21/32 |
| | | | 701/409 |
| 2016/0325739 A1* | 11/2016 | Litz | G05D 1/0891 |
| 2016/0325753 A1* | 11/2016 | Stein | G06K 9/46 |

* cited by examiner

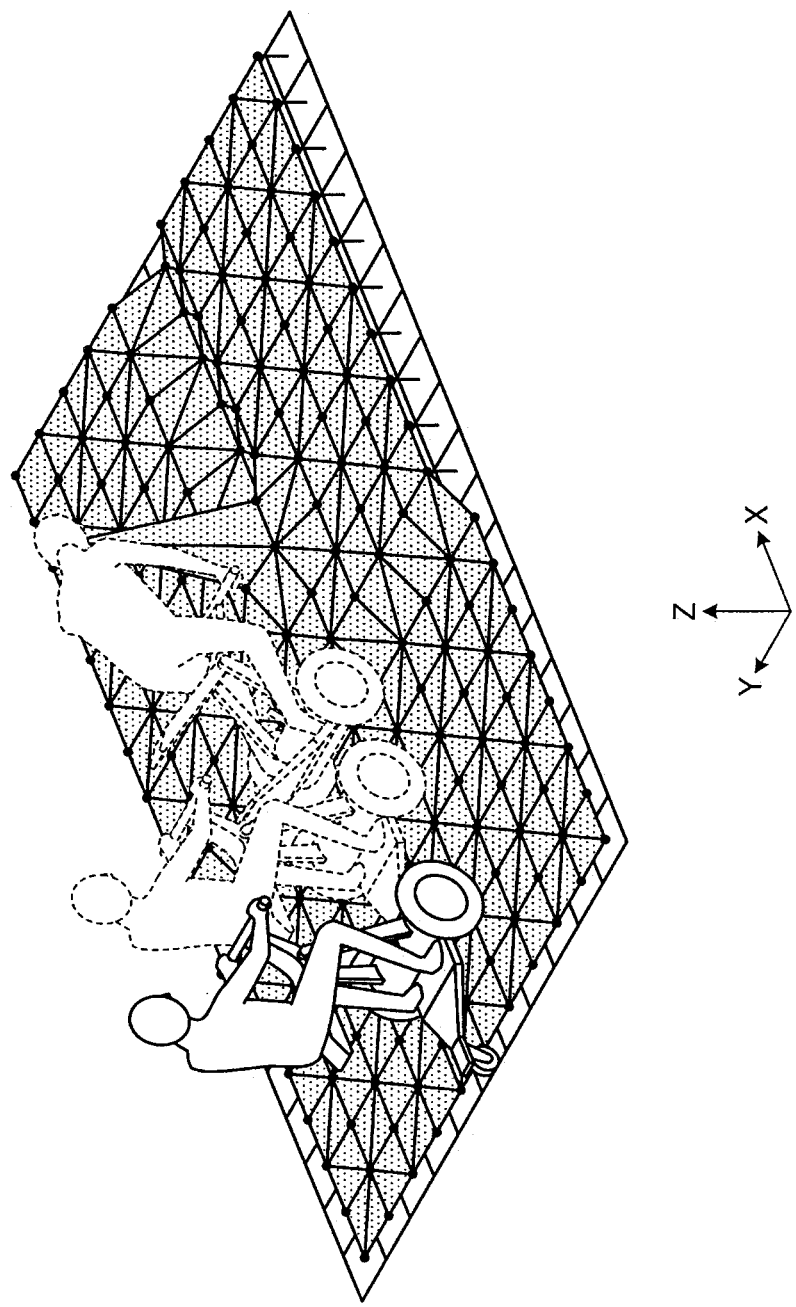

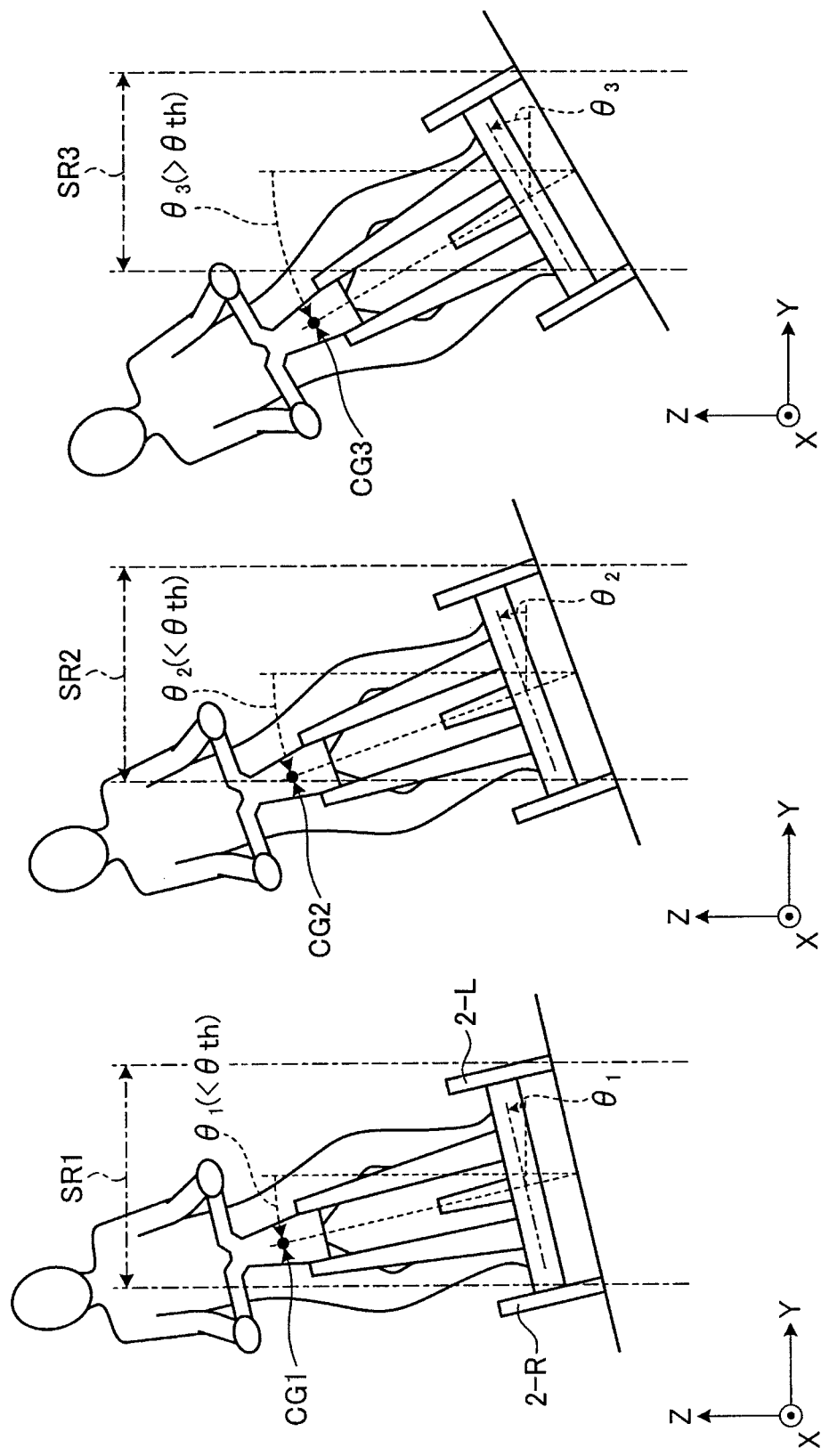

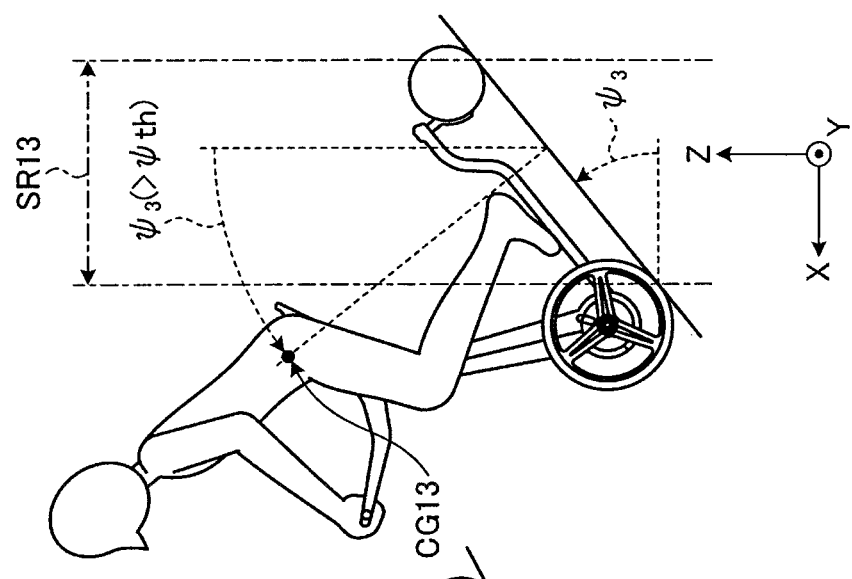
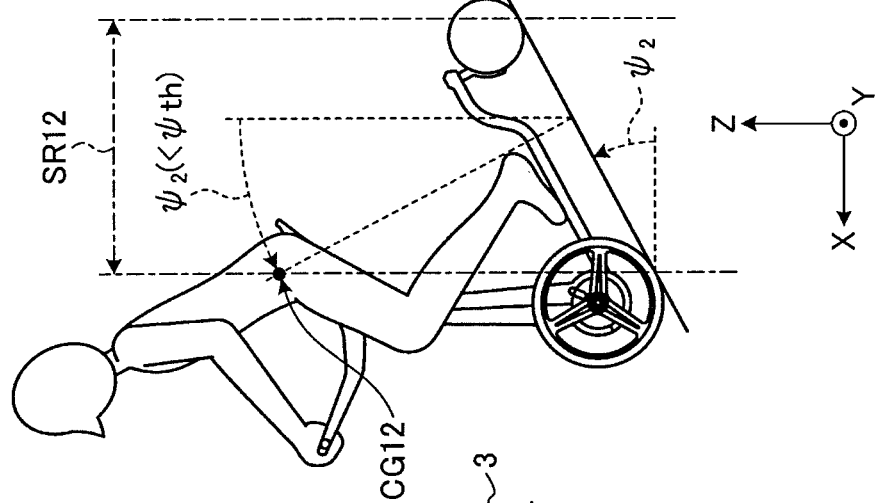
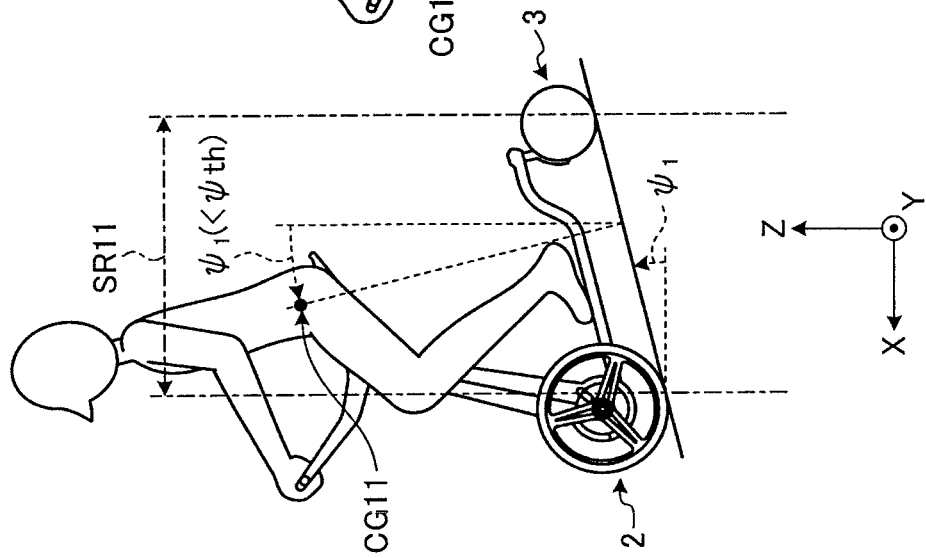

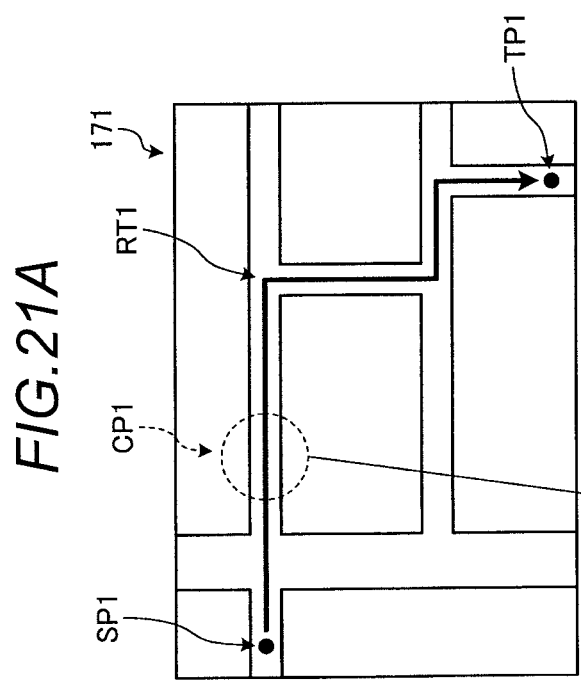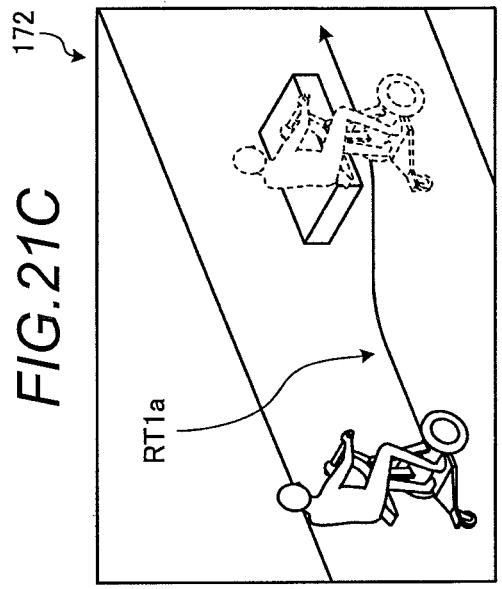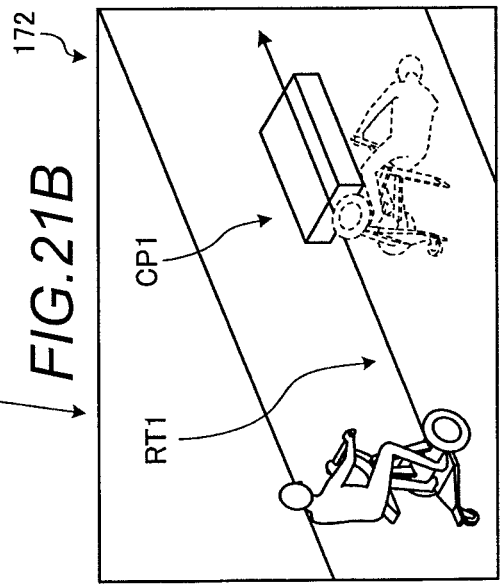

MOVING BODY

CROSS REFERENCE TO RELATED APPLICATIONS

This application is based on and claims priority under 35 U.S.C. § 119 to Japanese Patent Application 2017-207110, filed on Oct. 26, 2017, the entire contents of which are incorporated herein by reference.

TECHNICAL FIELD

An embodiment of this disclosure relates to a moving body.

BACKGROUND DISCUSSION

If a cause of overturning such as a step or an obstacle exists at a front side of a moving body, the moving body is likely to overturn when the moving body travels to a position of the cause of overturning. See, for example, JP2011-218075A (Reference 1).

To avoid the overturning of the moving body, it is necessary to predict, with high precision, a possibility of overturning of the moving body prior to the travel of the moving body.

Thus, a need exists for a moving body which is not susceptible to the drawback mentioned above.

SUMMARY

A moving body according to an aspect of this disclosure is directed, for example, a moving body including: a first detection unit configured to detect three-dimensional information on a space in which the moving body travels; a second detection unit configured to detect a state of the moving body; and a control unit configured to predict a possibility of overturning of a virtual moving body by allowing the virtual moving body corresponding to the moving body to travel on a virtual road surface in a virtual space prior to a travel of the moving body on a road surface based on a shape of the virtual road surface in the virtual space corresponding to the detected three-dimensional information and based on the detected state of the moving body, and performs control depending on the predicted possibility of overturning.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a view illustrating a process of allowing a virtual moving body to travel in the virtual space in the embodiment;

FIGS. 9A to 9C are views illustrating a process of predicting a possibility of overturning in the embodiment;

FIGS. 10A to 10C are views illustrating a process of predicting a possibility of overturning in the embodiment;

FIGS. 21A to 21C are views illustrating an operation of the moving body according to another modified example of the embodiment.

DETAILED DESCRIPTION

Figure 1:
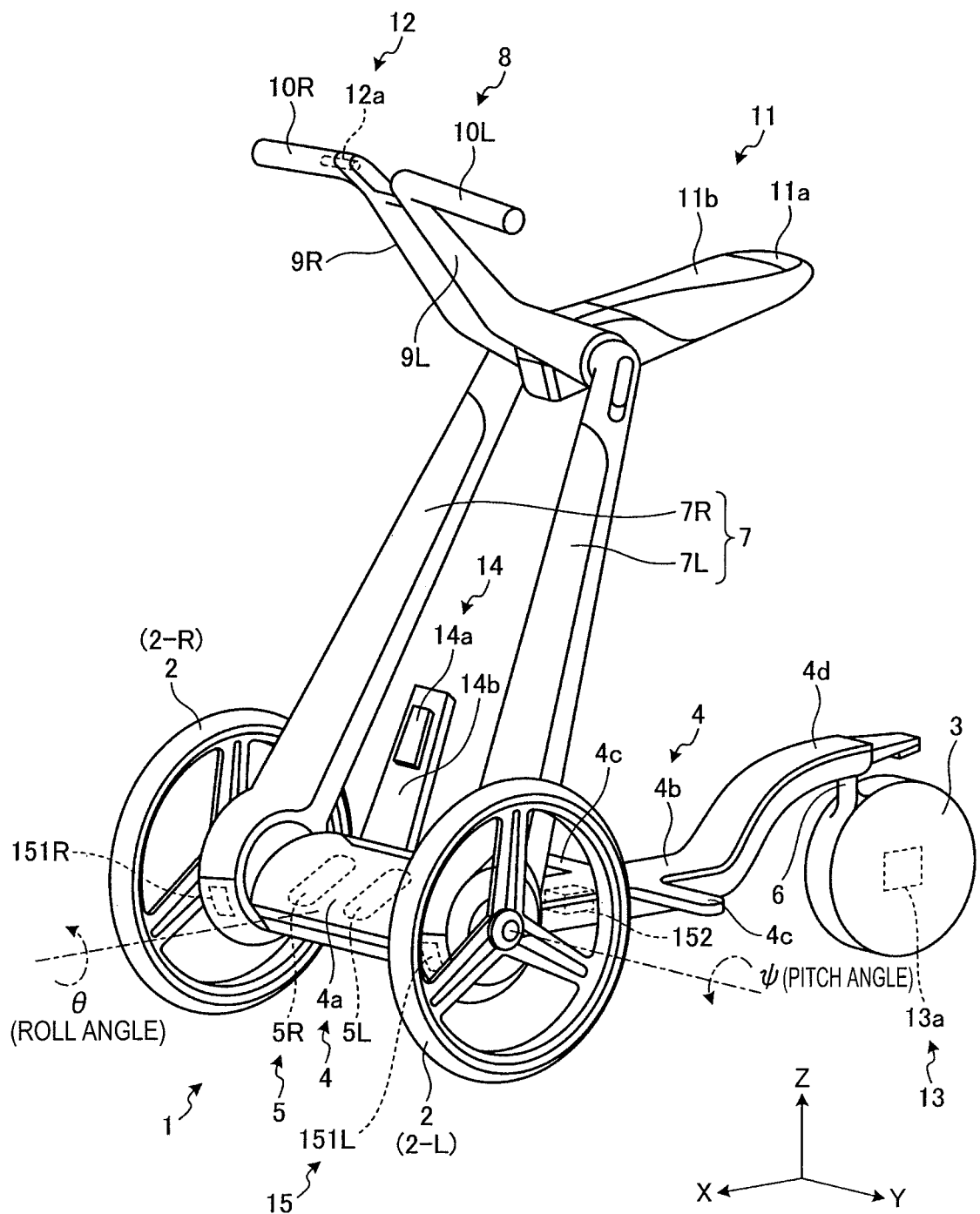
FIG. 1 is a view illustrating an external appearance configuration of a moving body according to an embodiment.

Hereinafter, a moving body according to an embodiment will be described in detail with reference to the accompanying drawings. Further, this disclosure is not limited by the embodiment.

Embodiment

If a cause of overturning such as a step or an obstacle exists at a front side of a moving body such as a bicycle or a tricycle, the moving body is likely to overturn when the moving body travels to a position of the cause of overturning. To avoid the overturning of the moving body, it is necessary to predict, with high precision, the possibility of overturning of the moving body prior to the travel of the moving body.

In contrast, it is possible to conceive first control which prevents falling of an occupant by acquiring, in a time series, a distance value to a travel road surface from a distance measuring sensor mounted on a vehicle, detecting a step and discriminating the type of step based on a time-series change in distance values, and warning the occupant or stopping the vehicle when the step becomes closer to the vehicle beyond a predetermined distance.

The first control is targeted at the prevention of falling into a step and a groove and corresponds to a road surface shape having a predetermined number (e.g., 5) of regular patterns, and as a result, there is a likelihood that scenes, which may be used by the occupant, are limited. Because a possibility of falling is determined by a relative distance between a host vehicle and a road surface and an inclination of the host vehicle is not considered, the determination may be performed by using an incorrect pattern of the road surface shape when the host vehicle exists on a slope, and as a result, there is a likelihood that it may be determined, by mistake, that the vehicle may travel a location where the vehicle will normally overturn.

In addition, it is possible to conceive second control which prevents falling of the occupant by determining, based on a continuous distance of a step and a predetermined traversable distance, whether the vehicle is capable of traversing the step, and issuing a warning or stopping the vehicle when the vehicle is capable of traversing the step.

In the second control, whether the vehicle is capable of traversing a step or a groove is determined by using the shapes such as the continuous distance of the step and the predetermined traversable distance, but actually, invisible potential factors, such as a center of gravity of an occupant and a center of gravity and a speed of the vehicle, are not considered. For this reason, there is a likelihood that the traversability cannot be accurately determined.

Therefore, according to the moving body according to the present embodiment, high precision in predicting the possibility of overturning is achieved by allowing a virtual moving body to travel, based on information on a state of the moving body, in a virtual space corresponding to three-dimensional information on a space at the periphery of the moving body, prior to the travel of the moving body, and predicting the possibility of overturning.

Specifically, a road surface shape is restored based on data of a sensor that perceives a state of the moving body and based on data of a sensor that perceives a space in a global virtual space in a computer, in real time, while the moving body travels. Further, a virtual moving body, which has the same specifications (parameters) as an actual moving body, is created on a virtual road surface, and the virtual moving body travels in advance the course of the actual moving body based on the time that varies in accordance with states of the moving body and the road surface shape. In this regard, a physical simulation is performed on a contact surface between the virtual road surface and the virtual moving body to determine the possibility of overturning based on a change in posture of the virtual moving body and the like, and if there is the possibility of overturning, control is performed to issue a warning, limit a speed, or avoid the overturning.

That is, a virtual environment, which simulates an actual environment, is established, and an approach of predicting the overturning is made by the virtual moving body, and as a result, it is possible to determine, as the movement of the moving body, what kinds of possibility of overturning is involved in the moving body (e.g., overturning to the left or sudden braking caused by derailment of a rear wheel). Therefore, it is possible to provide the occupant with feedback about a specific method of coping with the possibility of overturning, and in some instances, the moving body itself may determine the possibility of overturning and avoid the overturning. As a result, it is possible to provide an environment in which the moving body may pleasantly travel without excessively warning the occupant, excessively limiting a speed, or determining that the moving body may travel a location that the moving body cannot travel normally.

A moving body 1 is, for example, personal mobility and has an external appearance configuration, as illustrated in FIG. 1. FIG. 1 is a view illustrating an external appearance configuration of the moving body 1. Hereinafter, a direction corresponding to a travel direction of the moving body 1 on a horizontal plane is defined as an X direction, a vertical upward direction is defined as a Z direction, and a direction orthogonal to the X direction and the Z direction is defined as a Y direction.

The moving body 1 has wheels 2, an auxiliary wheel 3, a frame 4, a drive unit 5, a bearing member 6, a stay 7, a handle 8, a seat 11, an input unit 12, a control unit 13, a detection unit (first detection unit) 14, and a detection unit (second detection unit) 15.

The wheels 2 and the auxiliary wheel 3 are disposed to be spaced apart from one another in the X direction. The wheels 2 are spaced apart from each other in the Y direction and provided as a pair (a right wheel 2-R and a left wheel 2-L when viewed from the −X side). The frame 4 is disposed between the two wheels 2-R and 2-L and the auxiliary wheel 3, and supports the two wheels 2 and the auxiliary wheel 3 so that the two wheels 2 and the auxiliary wheel 3 are rotatable. The frame 4 may be turned as the two wheels 2-R and 2-L rotate at different rotation speeds.

The frame 4 has a holder portion 4a, load placing portions 4b, foot rest portions 4c, and a support portion 4d. The holder portion 4a has an approximately tubular shape extending in an axial direction (Y direction) of the two wheels 2-R and 2-L. The holder portion 4a accommodates motors 5R and 5L as the drive unit 5 for rotary-driving the two wheels 2-R and 2-L. The load placing portion 4b extends in the −X direction approximately in parallel with the X-Y plane from the holder portion 4a so as to approach the auxiliary wheel 3. The foot rest portions 4c are provided as a pair and protrude in the +Y direction and the −Y direction from an intermediate position in the X direction of the load placing portion 4b. The load placing portions 4b and the foot rest portions 4c have an approximately cross shape when viewed from the +Z side. The support portion 4d is connected to a −X side end of the load placing portion 4b and curved in the +Z direction as the support portion 4d extends in the −X direction.

The drive unit 5 has the motors 5R and 5L. The motors 5R and 5L may be independently controlled by the control unit 13. Under the control of the control unit 13, the motor 5R rotates the wheel 2-R, and the motor 5L rotates the wheel 2-L.

The bearing member 6 is provided in the vicinity of a −X side end of the support portion 4d and supports the auxiliary wheel 3 on the support portion 4d so that the auxiliary wheel 3 is rotatable. The frame 4 may be turned as the bearing member 6 rotates about the Z direction.

The stay 7 has arm portions 7R and 7L. The arm portions 7R and 7L are interposed between the respective wheels 2-R and 2-L and the holder portion 4a in the Y direction and connected to be rotatable about the Y direction. The two arm portions 7R and 7L are inclined to approach each other in the Y direction as the two arm portions 7R and 7L extend in the +Z direction.

The handle 8 is disposed at +Z side ends of the two arm portions 7R and 7L. The handle 8 is supported to be rotatable about the Y direction in a state in which the handle 8 is interposed between the two arm portions 7R and 7L. The handle 8 has extension portions 9R and 9L and grip portions 10R and 10L. The extension portions 9R and 9L are provided as a pair and adjacent to the two arm portions 7R and 7L in the Y direction and then extend from +Z ends of the two arm portions 7R and 7L. The grip portions 10R and 10L are provided as a pair and protrude oppositely in the Y direction from +Z side ends of the extension portions 9R and 9L. A +Y side end of the extension portion 10R and a −Y side end of the extension portion 10L are connected to each other.

The seat 11 is disposed at the +Z side ends of the two arm portions 7R and 7L. The seat 11 has an approximately saddle shape and is supported to be rotatable about the Y direction in a state in which the seat 11 is interposed between the two extension portions 9R and 9L of the handle 8. The seat 11 has a handle portion 11a and a main body portion 11b. The main body portion 11b is a portion on which an occupant is seated. The handle portion 11a is connected to a −X side end of the main body portion 11b and opened in the Z direction.

The input unit 12 has an operational interface 12a. The operational interface 12a is provided on the grip portion 10R or the grip portion 10L of the handle 8. The operational interface 12a is, for example, a joystick or the like and is configured to receive an operation instruction related to a travel speed or a direction in which the moving body 1 travels.

The control unit 13 has an electronic control device 13a. The electronic control device 13a is installed at an appropriate point (e.g., in the vicinity of the auxiliary wheel 3) of the moving body 1 and integrally controls the respective parts of the moving body 1. For example, the electronic control device 13a may receive, from the operational interface 12a, an operation instruction (operation signal) created by an operation of the occupant, and may perform a control operation depending on the operation instruction.

The detection unit 14 detects three-dimensional information on a space in which the moving body 1 travels. The detection unit 14 has a distance measuring sensor 14a and an arm portion 14b. The arm portion 14b extends in the +Z direction from the holder portion 4a and retains the distance measuring sensor 14a so that a distance at a front side (+X side) of the moving body 1 may be measured.

The distance measuring sensor 14a may three-dimensionally measure a distance at the front side of the moving body 1 by using, for example, a light detection and ranging (LiDAR) technology. The distance measuring sensor 14a scans the X-Y plane at the front side (+X side) of the moving body 1 while radially outputting laser beams, thereby detecting information on a three-dimensional distance, to a road surface or the like, at the front side of the moving body 1. The distance measuring sensor 14a performs detection (sensing) based on the so-called time of flight (TOF) principle that detects a distance of the road surface reflecting the laser beams in a measurement direction at any point in time, depending on angles at which the laser beams are emitted and depending on the time required until the laser beams are reflected after the laser beams are emitted. Further, instead of the sensor using the LiDAR technology, the distance measuring sensor 14a may be a sonar that emits ultrasonic waves and perceives reflective waves from the ultrasonic waves.

The detection unit 15 detects a state of the moving body 1. The detection unit 15 has wheel speed sensors 151R and 151L and a posture sensor 152. The multiple wheel speed sensors 151R and 151L are, for example, encoders (wheel encoders), and correspond to the multiple wheels 2-R and 2-L, respectively. The respective wheel speed sensors 151R and 151L detect rotation angles or rotation numbers per unit time of the corresponding wheels 2-R and 2-L and output a detection result (sensor value). The posture sensor 152 is, for example, a gyro-sensor (inertial sensor) and may detect an inclination angle that indicates the posture of the moving body 1. The inclination angle includes a pitch angle $\Psi$ which indicates an inclination about the Y direction, and a roll angle $\theta$ which indicates an inclination in the Y-Z plane. The pitch angle $\Psi$ may have a + angle counterclockwise and a − angle clockwise. The roll angle $\theta$ may have a + angle counterclockwise and a − angle clockwise.

Figure 2:
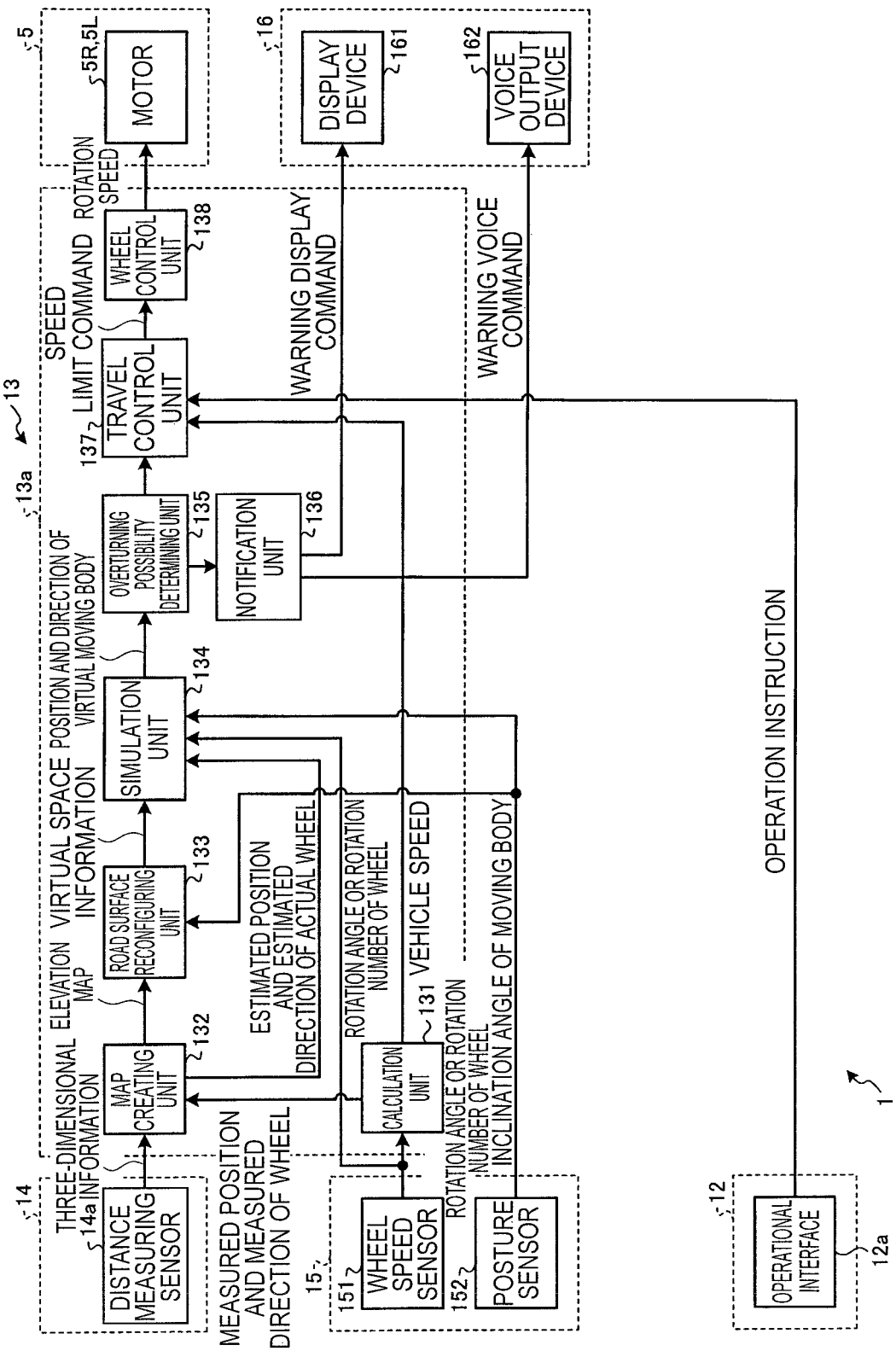
FIG. 2 is a diagram illustrating a functional configuration of the moving body according to the embodiment.

In view of functionality, the moving body 1 is configured, for example, as illustrated in FIG. 2. FIG. 2 is a diagram illustrating a functional configuration of the moving body 1.

The moving body 1 has the input unit 12, the detection unit 14, the detection unit 15, the drive unit 5, an output unit 16, and the control unit 13. The input unit 12 has the operational interface 12a. The detection unit 14 has the distance measuring sensor 14a. The detection unit 15 has the wheel speed sensors 151 and the posture sensor 152. The drive unit 5 has the motors 5R and 5L. The output unit 16 has a display device 161 and a voice output device 162.

The control unit 13 has the electronic control device 13a. The electronic control device 13a has a calculation unit 131, a map creating unit 132, a road surface reconfiguring unit 133, a simulation unit 134, an overturning possibility determining unit 135, a notification unit 136, a travel control unit 137, and a wheel control unit 138.

The calculation unit 131 obtains a vehicle speed (detected vehicle speed) depending on the sensor value (a rotation angle or a rotation number per unit time of the wheel 2) from the wheel speed sensor 151, and provides information on the vehicle speed to the travel control unit 137. The travel control unit 137 defines a vehicle speed indicated by an operation instruction as a target vehicle speed, obtains a deviation between the detected vehicle speed and the target vehicle speed, and increases or decreases the rotation speeds of the motors 5R and 5L through the wheel control unit 138 in accordance with the deviation (e.g., in order to allow the deviation to approach zero). In addition, in a case in which the travel direction indicated by the operation instruction indicates a turning operation, the travel control unit 137 increases and decreases the rotation speeds of the respective motors 5R and 5L through the wheel control unit 138 in order to create a speed difference between the left and right wheels 2-R and 2-L in accordance with the turning operation.

That is, the control unit 13 performs drive control of the motors 5R and 5L depending on the operation instruction (operation signal) from the operational interface 12a. The control unit 13 controls the travel of the moving body 1 by controlling the rotations of the two wheels 2-R and 2-L by performing drive control of the motors 5R and 5L. For example, the control unit 13 rotates the motors 5R and 5L forward, thereby moving the moving body 1 straight in a travel direction (hereinafter, referred to as a "forward travel direction") in which the wheels 2 precede the auxiliary wheel 3. On the contrary, the control unit 13 rotates the motors 5R and 5L reversely, thereby moving the moving body 1 straight in a travel direction (hereinafter, referred to as a "reverse travel direction") in which the wheels 2 follow the auxiliary wheel 3.

The calculation unit 131 calculates a measured position and a measured direction of the wheel depending on the sensor value (the rotation angle or the rotation number per unit time of the wheel 2) from the wheel speed sensor 151, and supplies the measured position and the measured direction of the wheel to the map creating unit 132. The map creating unit 132 creates an elevation map depending on the three-dimensional information (three-dimensional information on unevenness of the road surface at the front side) from the distance measuring sensor 14a and the measured position and the measured direction of the wheel. The elevation map is a local map including three-dimensional unevenness. By using a simultaneous localization and mapping (SLAM) technology, the map creating unit 132 estimates a self-position (a position and a direction of the actual wheel) in real time in accordance with the movement of the moving body 1 and creates the elevation map that indicates a distribution of unevenness of the circumferential road surface. The map creating unit 132 supplies the elevation map to the road surface reconfiguring unit 133, and supplies the position and the direction of the actual wheel to the simulation unit 134. The road surface reconfiguring unit 133 receives information on the inclination angle of the moving body 1 from the posture sensor 152, corrects (reconfigures) the elevation map depending on the inclination angle of the moving body 1, creates information on a virtual space including a reconfigured virtual road surface, and supplies the information to the simulation unit 134.

The simulation unit 134 receives the sensor value of the wheel speed sensor 151 and the sensor value of the posture sensor 152, and depending on the sensor value of the wheel speed sensor 151 and the sensor value of the posture sensor 152, the simulation unit 134 specifies a state of the moving body 1 (at least one of a proceeding direction of the moving body 1, a posture of the moving body 1, a position of a center of gravity of the moving body 1, a speed of the moving body 1, acceleration of the moving body 1, a load state of the moving body 1, and a grounded state of the moving body 1). For example, in a case in which the occupant rides the moving body 1, the simulation unit 134 may obtain, as the position of the center of gravity of the moving body 1, a position at which a correction amount made in accordance with the acceleration and the posture of the moving body 1 is applied to an intermediate point between a center of mass of the moving body 1 and a center of mass of the occupant when the occupant is seated at a standard seating position. The simulation unit 134 disposes the virtual moving body in the virtual space in accordance with the position and the direction of the actual wheel. The virtual moving body is a virtual moving body which may operate similarly to the actual moving body 1 and to which the specifications (a shape, a position of a center of mass, rigidity, materials, the number and position of wheels, a coefficient of friction of the wheel against the road surface, and the like) of the moving body 1 are applied. Based on the shape of the virtual road surface in the virtual space and the detected state of the moving body, the simulation unit 134 performs a physical simulation in which the virtual moving body travels on the virtual road surface in the virtual space prior to the travel of the moving body 1 on the road surface. The simulation unit 134 supplies the overturning possibility determining unit 135 with a position and a direction of the virtual moving body in the virtual space as a result of the physical simulation.

Depending on the position and the direction of the virtual moving body in the virtual space, the overturning possibility determining unit 135 predicts the possibility of overturning of the virtual moving body and determines whether there is the possibility of overturning. The overturning possibility determining unit 135 supplies the determination result to the notification unit 136 and the travel control unit 137.

When there is the possibility of overturning as the result of the determination, the notification unit 136 notifies a warning of the possibility of overturning. For example, when there is the possibility of overturning, the notification unit 136 may supply a warning display command to the display device 161 or may supply a warning voice command to the voice output device 162. For example, the display device 161 is a display lamp such as an LED, and when the display device 161 receives the warning display command, the display device 161 performs lighting display that indicates that there is the possibility of overturning. Alternatively, for example, the voice output device 162 is a buzzer capable of generating a warning sound, and when the voice output device 162 receives the warning voice command, the voice output device 162 outputs the warning sound.

When there is the possibility of overturning as the result of the determination, the travel control unit 137 creates a speed limit command and supplies the speed limit command to the wheel control unit 138. The wheel control unit 138 controls the motors 5R and 5L to decrease the speed.

Figure 3A:
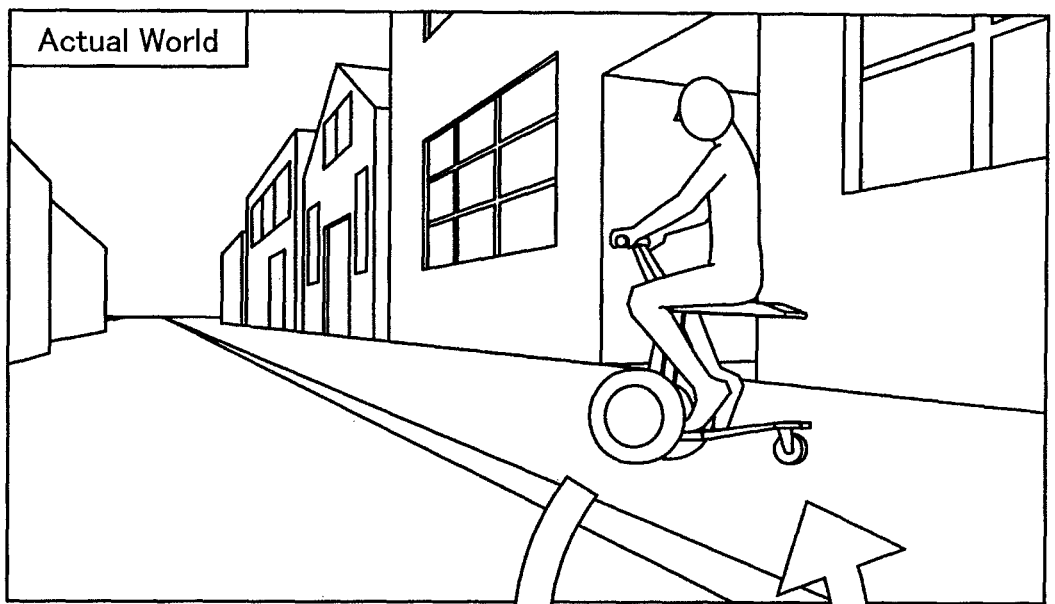
FIGS. 3A and 3B are views illustrating an operation of the moving body according to the embodiment.
Figure 3B:
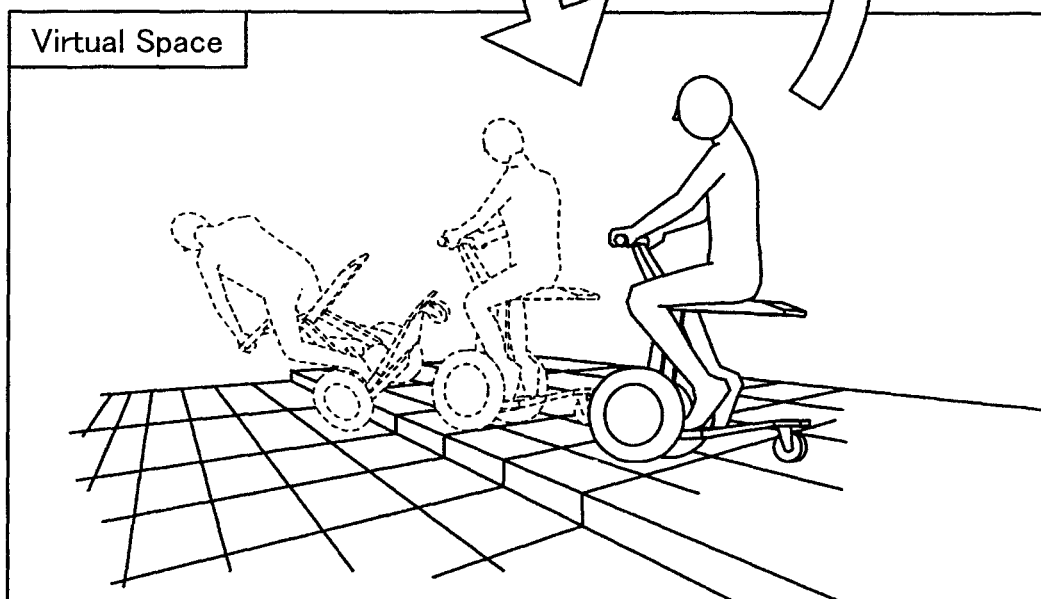

That is, the moving body 1 operates as illustrated in FIGS. 3A and 3B. FIGS. 3A and 3B are views illustrating an operation of the moving body 1. In the moving body 1, the control unit 13 utilizes the physical simulation to create the virtual space illustrated in FIG. 3B based on an actual world illustrated in FIG. 3A in real time while the moving body 1 travels. Further, as illustrated in FIG. 3B, the control unit 13 allows the virtual moving body to travel on the road surface shape restored in the virtual space, determines the possibility of overturning based on a change in posture of the virtual moving body or the like, and controls the moving body 1 in the actual world as illustrated in FIG. 3A (notifies a warning, limits a speed, and performs an avoiding operation or the like) depending on the determination result.

Figure 4:
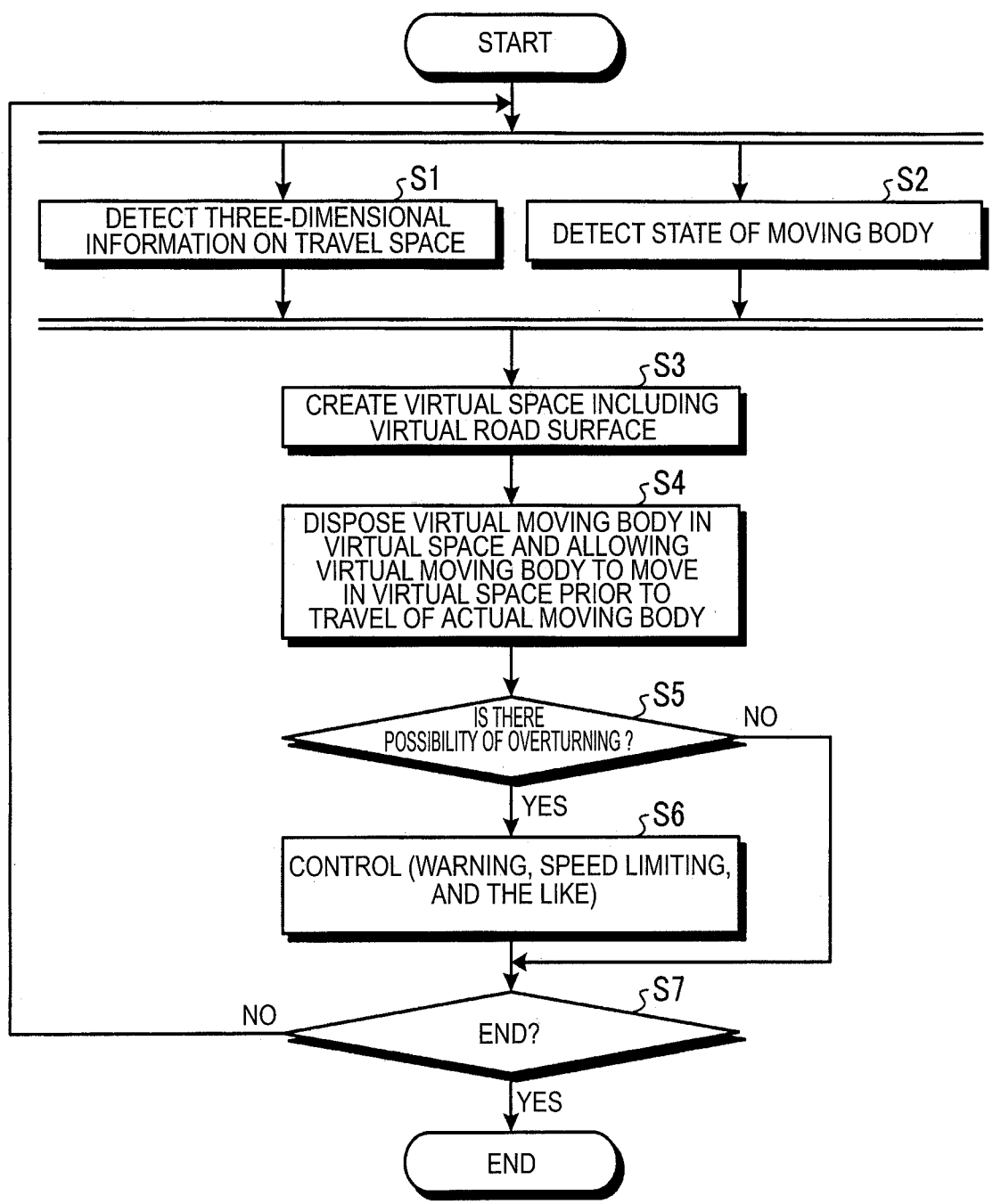
FIG. 4 is a flowchart illustrating an operation of the moving body according to the embodiment.

More specifically, the moving body 1 operates as illustrated in FIG. 4. FIG. 4 is a flowchart illustrating an operation of the moving body 1.

Figure 5:
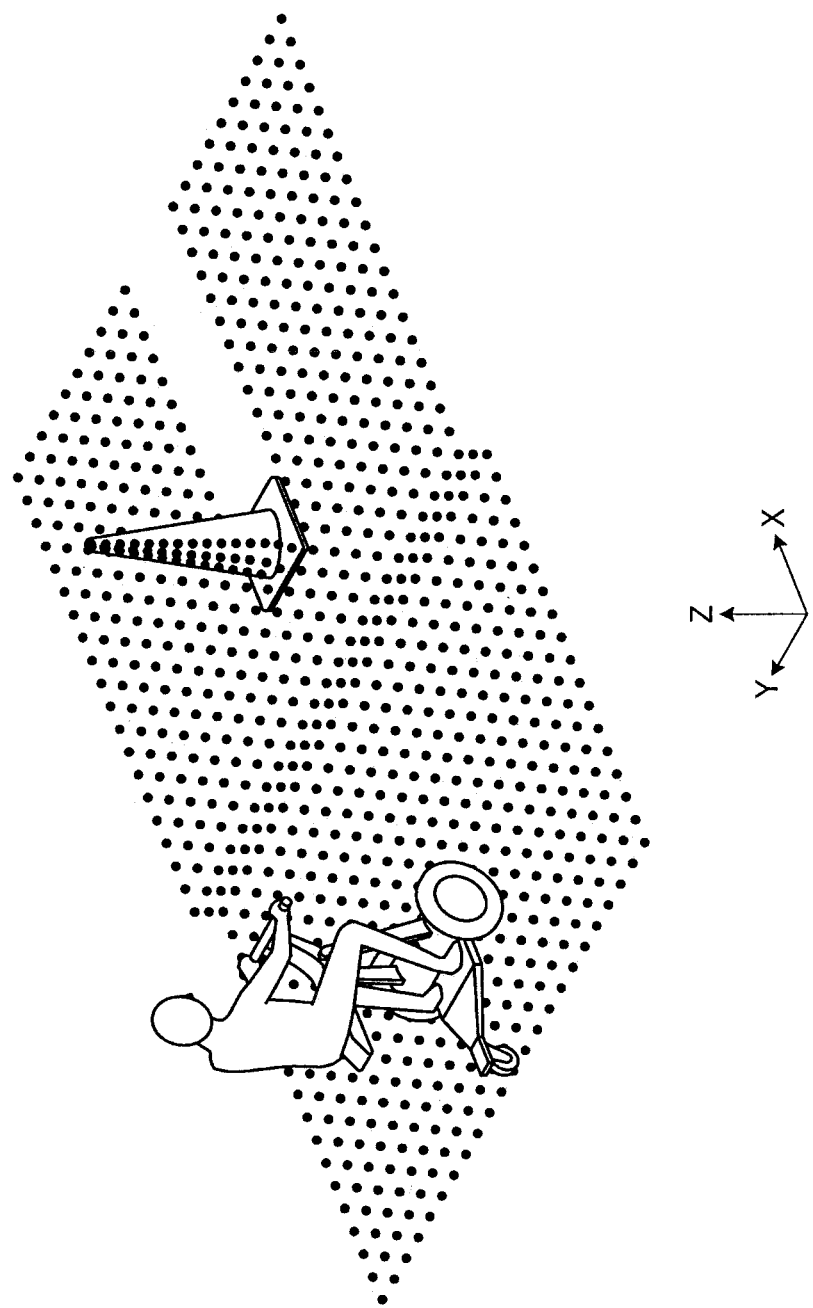
FIG. 5 is a view illustrating a process of detecting a travel space in the embodiment.

When the moving body 1 starts traveling, the moving body 1 detects the travel space while traveling (S1). For example, as illustrated in FIG. 5, the distance measuring sensor 14a of the detection unit 14 uses the LiDAR technology, acquires three-dimensional coordinates of a point group at the periphery of the front side of the moving body 1, and supplies the three-dimensional coordinates to the control unit 13. FIG. 5 is a view illustrating a process of detecting the travel space.

Referring back to FIG. 4, when the moving body 1 starts traveling, the state of the moving body 1 is detected in parallel with the detection in S1 (S2). For example, the wheel speed sensor 151 of the detection unit 15 detects the rotation angle or the rotation number per unit time of the wheel 2, and supplies the sensor value to the control unit 13. The posture sensor 152 of the detection unit 15 detects the inclination angle (roll angle $\theta$ and pitch angle $\Psi$) which indicates the posture of the moving body 1, and the posture sensor 152 supplies the sensor value to the control unit 13.

Depending on the detection results of S1 and S2, the moving body 1 creates the virtual space including the virtual road surface (S3).

Figure 6:
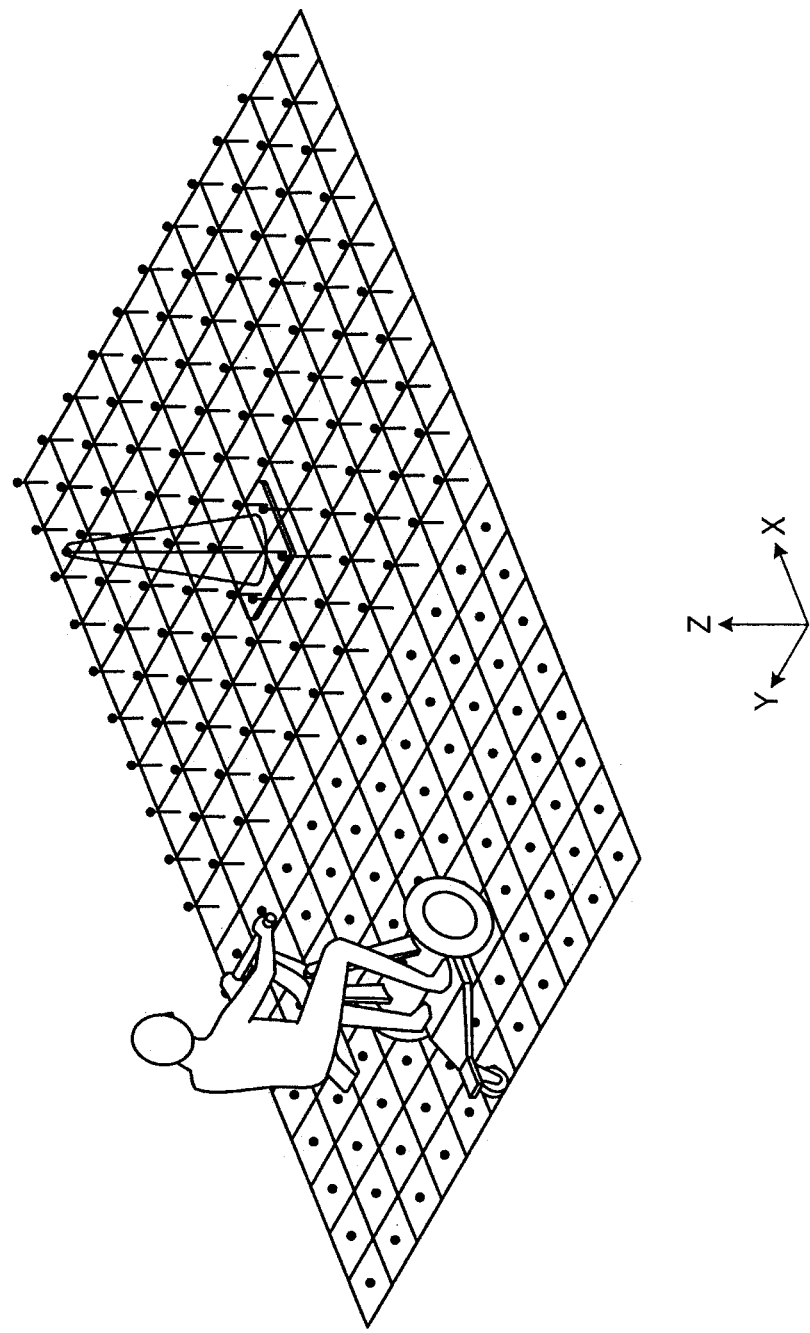
FIG. 6 is a view illustrating a process of creating an elevation map in the embodiment.

For example, as illustrated in FIG. 6, the control unit 13 uses the SLAM (simultaneously estimating a self-position and creating an environment map) technology, creates lattices corresponding to the point group (the three-dimensional coordinates of the point group at the periphery of the front side of the moving body 1) acquired in S1, and determines the lattices to which the respective points belong. In this case, the control unit 13 uses a dead reckoning (estimation of a relative self-position) technology and may correct the positions of the respective points depending on the sensor value of the wheel speed sensor 151 and the sensor value of the posture sensor 152. Depending on the result of determining the lattices to which the respective points belong after the correction, the control unit 13 creates a map with conformity (elevation map) and estimates a self-position. FIG. 6 is a view illustrating a process of creating the elevation map.

Figure 7:
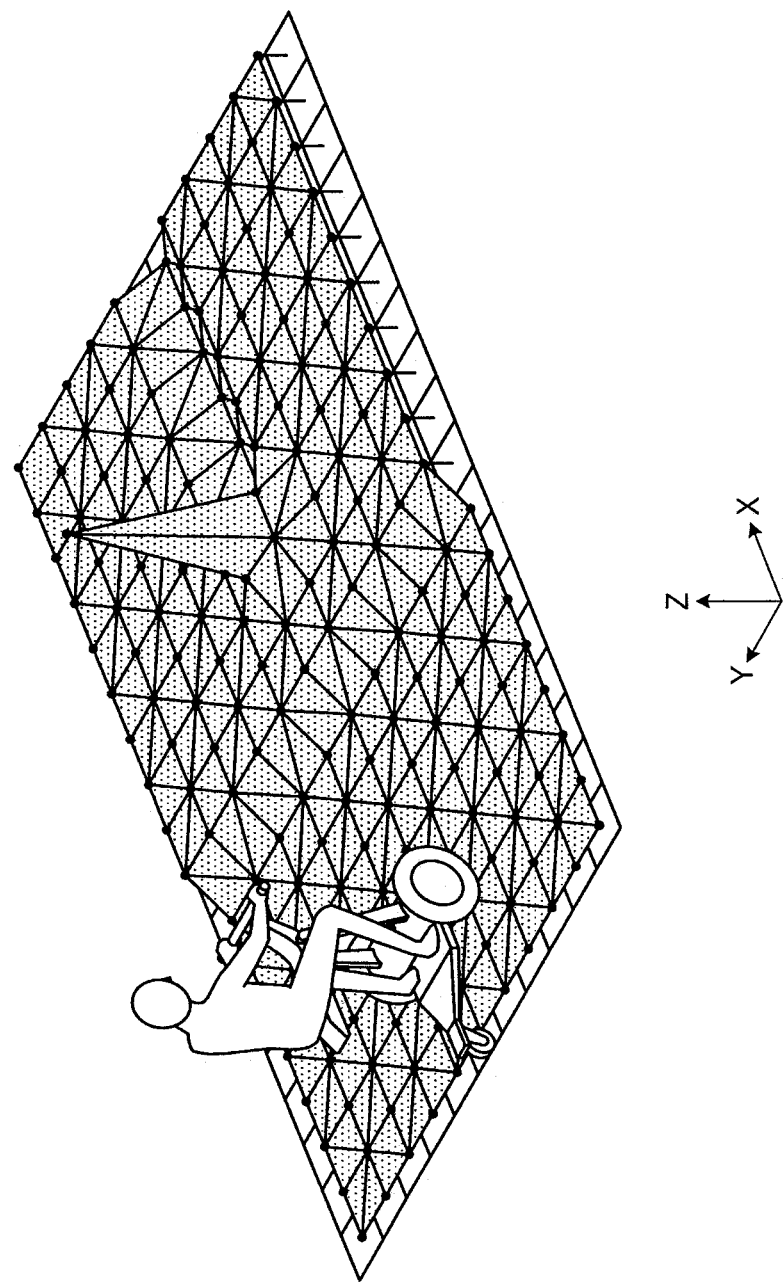
FIG. 7 is a view illustrating a process of creating a virtual space in the embodiment.

As illustrated in FIG. 7, the control unit 13 creates apices at positions at the center of the lattice and at additional heights in the respective lattices of the elevation map, and creates a triangular mesh from an apex of each of the lattices and apices on the adjacent two lattices. The control unit 13 applies the same to all of the lattices, thereby restoring the road surface shape (creating the shape of the virtual road surface). Therefore, the control unit 13 may create the virtual space including the virtual road surface. FIG. 7 is a view illustrating a process of creating the virtual space.

Referring back to FIG. 4, the moving body 1 disposes the virtual moving body in the virtual space, and allows the virtual moving body to travel in the virtual space prior to the travel of the actual moving body (S4). For example, as illustrated in FIG. 8, the control unit 13 disposes the virtual moving body at a predetermined cycle (e.g., a constant cycle) at the position in the virtual space corresponding to the self-position estimated in S3, and allows the virtual moving body to travel on the virtual road surface by applying the current wheel speed of the actual moving body to the virtual moving body. The control unit 13 eliminates the virtual moving body after the virtual moving body travels on the virtual road surface for a predetermined time (e.g., constant time). In this case, the control unit 13 performs the physical simulation on the contact surface between the virtual moving body and the virtual road surface, thereby calculating the posture of the virtual moving body. Here, the control unit 13 performs the physical simulation, at a speed of several times as high as the actual time (e.g., five times as high as the actual time), on the operation (physical phenomenon) of the virtual moving body when the virtual moving body travels at the same speed as that of the actual moving body, so that the virtual moving body travels in advance a predicted course of the actual moving body, and as a result, it is possible to confirm safety.

Depending on the result in S4 (result of physical simulation), the moving body 1 determines whether there is the possibility of overturning of the virtual moving body (S5).

For example, as illustrated in FIGS. 9A to 9C, depending on the roll angle $\theta$ of the virtual moving body, the control unit 13 may determine whether there is the possibility of overturning. In this case, assuming that a roll angle at a limit where the center of gravity of the virtual moving body goes beyond a supportable range of the virtual moving body is a threshold value $\theta$th (or $-\theta$th) of the roll angle, the control unit 13 compares the roll angle $\theta$ of the virtual moving body with the threshold value $\theta$th, thereby determining whether there is the possibility of overturning of the virtual moving body.

As indicated by the alternate long and short dash line in FIG. 9A, when viewed from the Y-Z cross section, it is assumed that a range interposed between straight lines obtained by extending the grounded positions of the wheels 2-R and 2-L of the virtual moving body in the +Z direction is a supportable range SR1 of the moving body 1. In the case of FIG. 9A, a center of gravity CG1 of the virtual moving body lies within the supportable range SR1, and the roll angle $\theta=\theta 1$ is smaller than the threshold value $\theta$th, and as a result, it may be determined that there is no possibility of overturning. In the case of FIG. 9B, a center of gravity CG2 of the virtual moving body lies within a supportable range SR2, and the roll angle $\theta=\theta 2$ is smaller than the threshold value $\theta$th, and as a result, it may be determined that there is no possibility of overturning. In the case of FIG. 9C, a center of gravity CG3 of the virtual moving body lies out of a supportable range SR3, and the roll angle $\theta=\theta 3$ is larger than the threshold value $\theta$th, and as a result, it may be determined that there is the possibility of overturning. FIGS. 9A to 9C are views illustrating a process of predicting the possibility of overturning.

Alternatively, for example, as illustrated in FIGS. 10A to 10C, depending on the pitch angle $\Psi$ of the virtual moving body, the control unit 13 may determine whether there is the possibility of overturning. In this case, assuming that a pitch angle at a limit where the center of gravity of the virtual moving body goes beyond a supportable range of the virtual moving body is a threshold value $\Psi$th (or $-\Psi$th) of the pitch angle, the control unit 13 compares the pitch angle $\Psi$ of the virtual moving body with the threshold value $\Psi$th, thereby determining whether there is the possibility of overturning of the virtual moving body.

As indicated by the alternate long and short dash line in FIG. 10A, when viewed from the X-Z cross section, it is assumed that a range interposed between the straight lines obtained by extending the grounded positions of the wheels 2 and the auxiliary wheel 3 of the virtual moving body in the +Z direction is a supportable range SR11 of the moving body 1. In the case of FIG. 10A, a center of gravity CG11 of the virtual moving body lies within the supportable range SR11, and the pitch angle $\Psi=\Psi 1$ is smaller than the threshold value $\Psi$th, and as a result, it may be determined that there is no possibility of overturning. In the case of FIG. 10B, a center of gravity CG12 of the virtual moving body lies within a supportable range SR12, and the pitch angle $\Psi=\Psi 2$ is smaller than the threshold value $\Psi$th, and as a result, it may be determined that there is no possibility of overturning. In the case of FIG. 10C, a center of gravity CG13 of the virtual moving body lies out of a supportable range SR13, and the pitch angle $\Psi=\Psi 3$ is larger than the threshold value $\Psi$th, and as a result, it may be determined that there is the possibility of overturning. FIGS. 10A to 10C are views illustrating a process of predicting the possibility of overturning.

Figure 11:
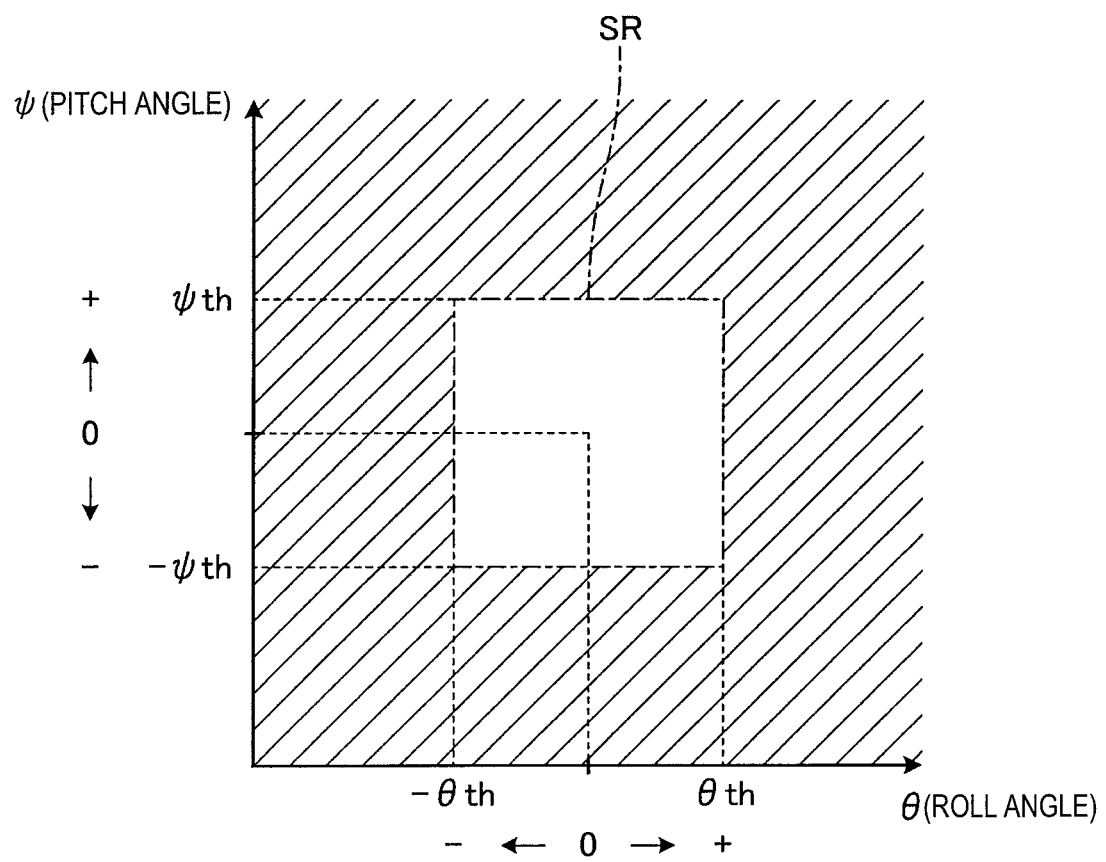
FIG. 11 is a view illustrating a process of predicting a possibility of overturning in the embodiment.

Referring to FIGS. 9A to 10C, the supportable range SR is a range in which the roll angle $\theta$ is $-\theta\text{th}\leq\theta\leq\theta\text{th}$ and the pitch angle $\Psi$ is $-\Psi\text{th}\leq\Psi\leq\Psi\text{th}$, as illustrated in FIG. 11. It may be determined that there is the possibility of overturning when the roll angle $\theta$ and the pitch angle $\Psi$ belong to the region (region hatched with the oblique lines in FIG. 11) lying out of the supportable range SR, and it may be determined that there is no possibility of overturning when the roll angle $\theta$ and the pitch angle $\Psi$ lie within the supportable range SR. FIG. 11 is a view illustrating a process of predicting the possibility of overturning.

The determination references in FIGS. 9A to 11 are merely examples, and the threshold value may be determined depending on the state of the actual moving body 1 or the property of the occupant. For example, the threshold value may be strictly determined when the speed of the moving body 1 is equal to or higher than a predetermined speed, and the threshold value may be loosely determined when the speed of the moving body 1 is lower than the predetermined speed. Alternatively, for example, the threshold value may be strictly determined when the occupant is an aged person or a minor, and the threshold value may be loosely determined when the occupant is an adult except for the aged person.

Referring back to FIG. 4, in the moving body 1, the process goes to S7 when it is determined that there is no possibility of overturning of the virtual moving body (No in S5), and the moving body 1 performs control in accordance with the possibility of overturning (S6) when it is determined that there is the possibility of overturning of the virtual moving body (Yes in S5). For example, the control unit 13 may warn the occupant or peripheral pedestrians with a sound and light. When a target speed calculated by an operation input of the occupant is equal to or higher than a predetermined speed (e.g., 1 km/h), the control unit 13 limits the target speed to the predetermined speed to decrease the speed thereby making it easy for the occupant to perform a driving operation (stopping, turning, or the like) of avoiding a portion of the road surface where there is the possibility of overturning.

The moving body 1 determines whether to end the process (S7). The moving body 1 returns the process back to S1 and S2 when the moving body 1 determines not to end the process (No in S7), and ends the process when the moving body 1 determines to end the process, for example, when the operation of stopping the driving is received from the occupant (Yes in S7).

As described above, in the embodiment, in the moving body 1, based on information on the state of the moving body 1, the virtual moving body virtually travels in the virtual space corresponding to the three-dimensional information on the space at the periphery of the moving body 1 prior to the travel of the moving body 1, thereby predicting the possibility of overturning. Therefore, it is possible to improve precision in predicting the possibility of overturning and to appropriately perform the control in accordance with the possibility of overturning, and as a result, it is possible to appropriately avoid the overturning of the moving body 1.

The map creating unit 132 illustrated in FIG. 2 may create map expression having height information such as a point group map, a multi-level surface map, and an octo-map, instead of the elevation map.

Figure 12:
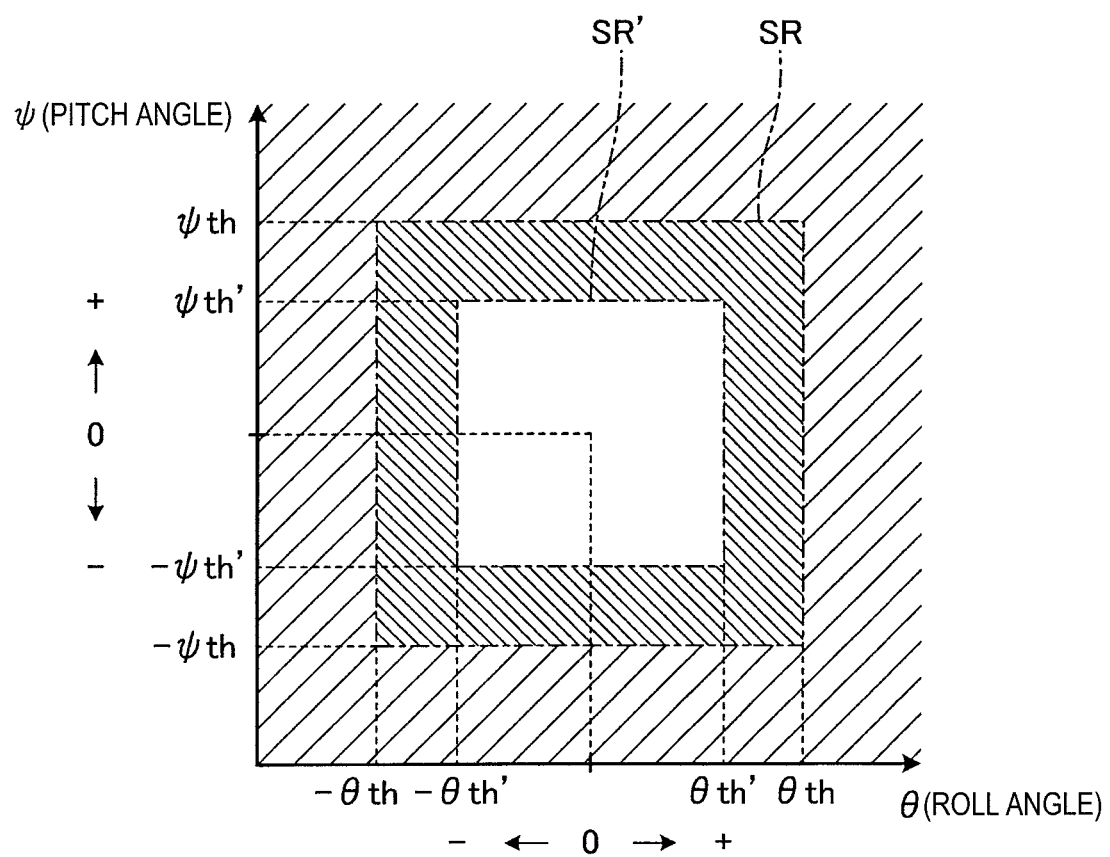
FIG. 12 is a view illustrating a process of predicting a possibility of overturning in a modified example of the embodiment.

In the determination of the possibility of overturning (S5) may be performed in a multi-stage manner. For example, as illustrated in FIG. 12, a stable support range SR' may be added within the supportable range SR. The supportable range SR is a range in which the roll angle $\theta$ is $-\theta th \leq \theta \leq \theta th$ and the pitch angle $\Psi$ is $-\Psi th \leq \Psi \leq \Psi th$. The stable support range SR' is a range in which the roll angle $\theta$ is $-\theta th' \leq \theta \leq \theta th'$ and the pitch angle $\Psi$ is $-\Psi th' \leq \Psi \leq \Psi th'$. In this case, $-\theta th < -\theta th' < 0 < \theta th' < \theta th$ and $-\Psi th < -\Psi th' < 0 < \Psi th' < \Psi th$ are satisfied.

For example, it may be determined that there is the possibility of overturning in a case in which the roll angle $\theta$ and the pitch angle $\Psi$ belong to a region (region hatched with the oblique lines with large intervals in FIG. 12) lying out of the supportable range SR. It may be determined that there is no possibility of overturning but the possibility of overturning is at a cautious level in a case in which the roll angle $\theta$ and the pitch angle $\Psi$ lie within the supportable range SR but belong to a region (region hatched with the oblique lines with small intervals in FIG. 12) lying out of the stable support range SR'. It may be determined that there is no possibility of overturning and the possibility of overturning is at a safe level in a case in which the roll angle $\theta$ and the pitch angle $\Psi$ lie within the stable support range SR'.

In this case, the control in accordance with the possibility of overturning (S6) may also be performed in a multi-stage manner. For example, the control unit 13 may issue multi-stage warnings by allowing the display lamp such as an LED to emit blue light when it is determined that the possibility of overturning is at the safe level, emit yellow light when it is determined that the possibility of overturning is at the cautious level, and emit red light when it is determined that there is the possibility of overturning.

Figure 13:
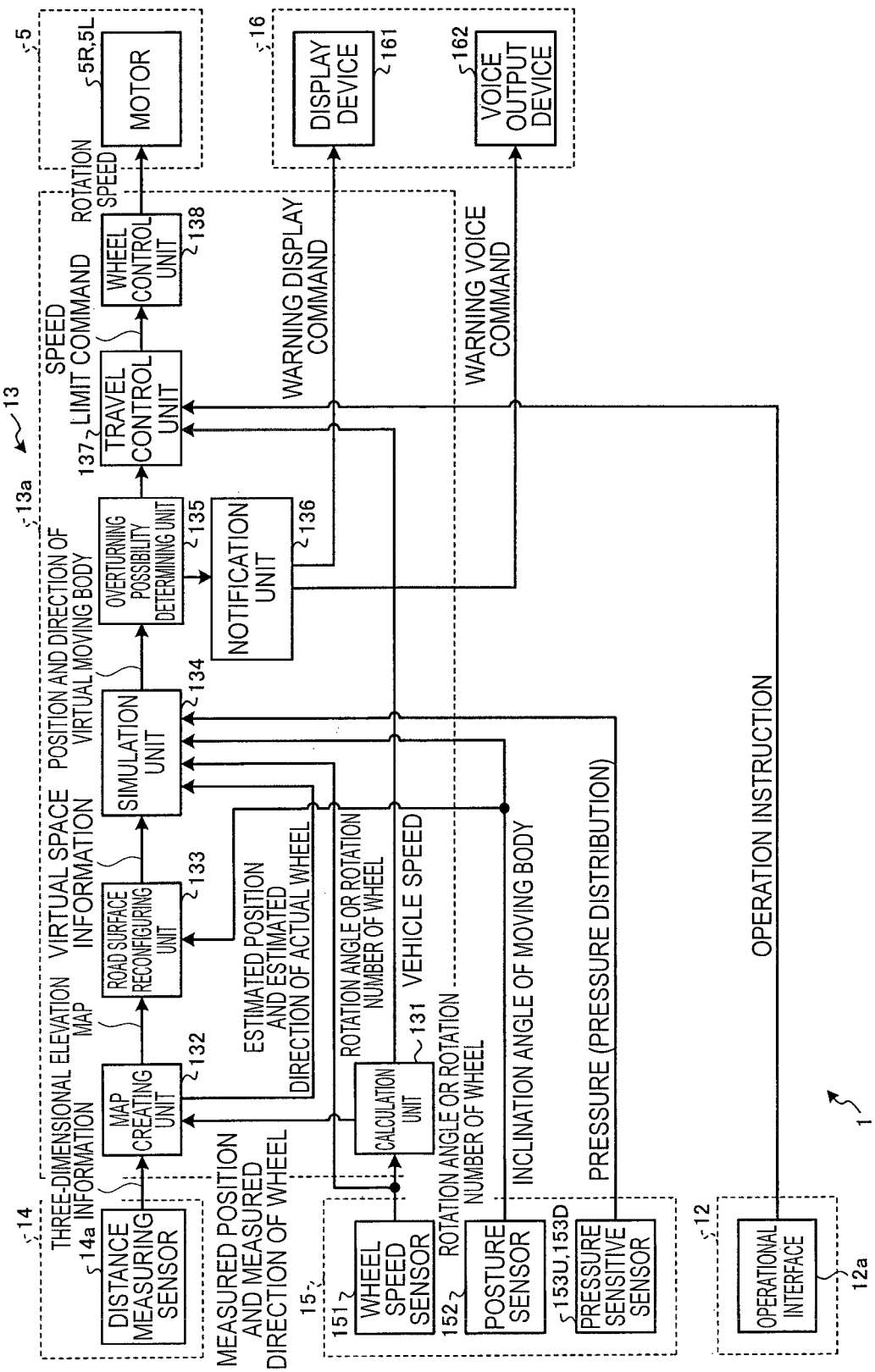
FIG. 13 is a diagram illustrating a functional configuration of a moving body according to another modified example of the embodiment.
Figure 14:
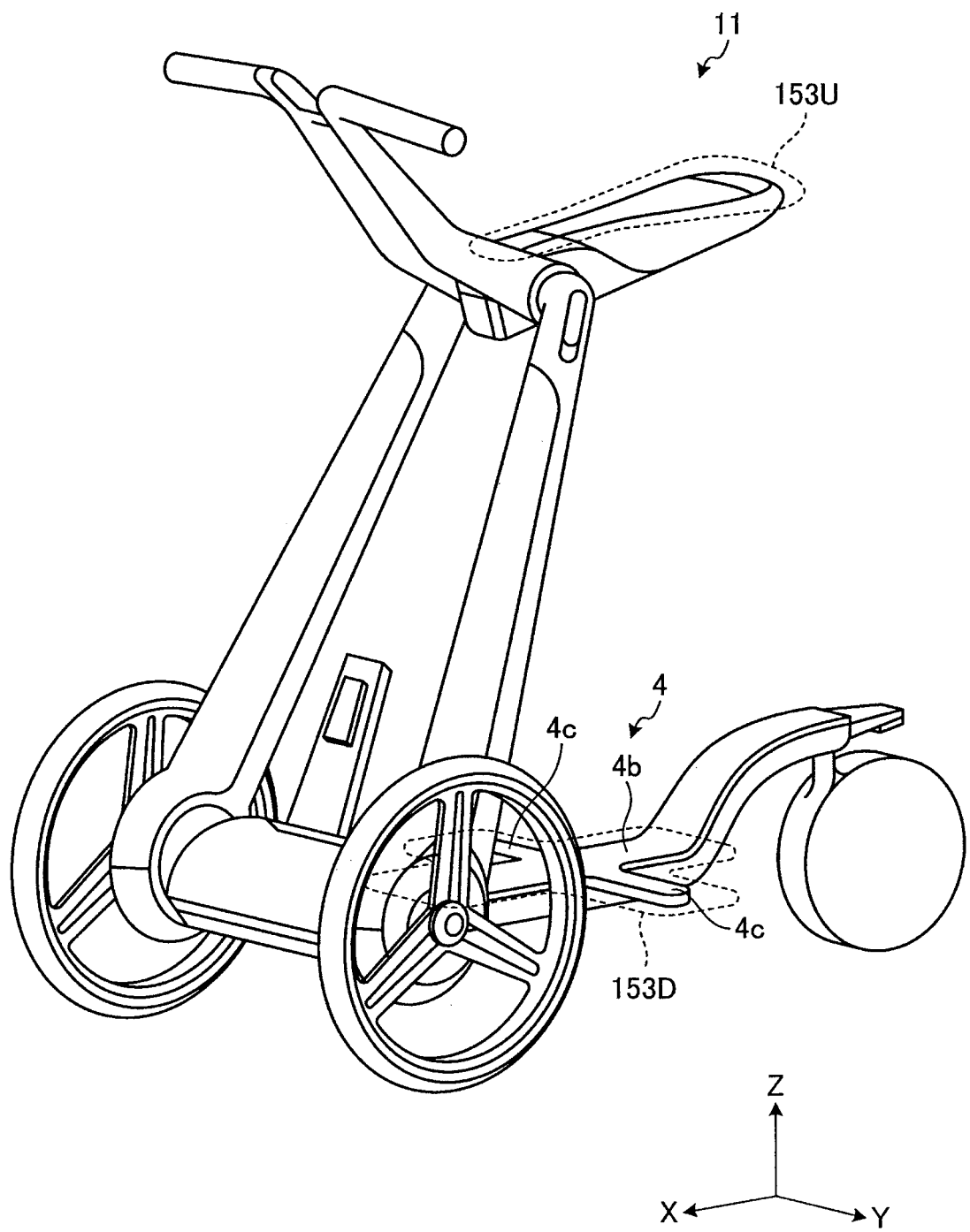
FIG. 14 is a view illustrating a configuration for detecting a state of the moving body in another modified example of the embodiment.

As the embodiment, the example in which the state of the center of gravity of the moving body 1 or the like is detected assuming that the occupant of the moving body 1 is seated on the standard seating position is described, but as illustrated in FIG. 13, the detection unit 15 may further have pressure sensitive sensors 153U and 153D configured to detect the state of the moving body 1 with higher precision. FIG. 13 is a diagram illustrating a functional configuration of the moving body 1 in another modified example of the embodiment. In this case, as illustrated in FIG. 14, the pressure sensitive sensor 153U may serve as a seating sensor provided on a seat surface of the seat 11, and the pressure sensitive sensor 153D may serve as a foot sensor provided on the load placing portion 4b and the foot rest portions 4c of the frame 4. FIG. 14 is a view illustrating a configuration for detecting a state of the moving body 1.

The respective pressure sensitive sensors 153U and 153D may detect a magnitude of load (pressure), and as illustrated in FIG. 13, the simulation unit 134 of the control unit 13 may estimate centers of gravity of an occupant and/or an article with high precision from the magnitudes of loads detected by the pressure sensitive sensors 153U and 153D and a correlation between the two loads.

Each of the pressure sensitive sensors 153U and 153D has a configuration in which multiple pressure sensitive elements are arranged two-dimensionally, and each of the pressure sensitive sensors 153U and 153D may be configured to detect a magnitude of load two-dimensionally. Therefore, by sensor values (pressure distributions) of the respective pressure sensitive sensors 153U and 153D, the simulation unit 134 of the control unit 13 may estimate, with higher precision, the centers of gravity of the occupant and/or the article.

After the simulation unit 134 estimates the center of gravity of the occupant, the simulation unit 134 performs the physical simulation by applying the center of gravity of the occupant to the virtual vehicle when performing the simulation, and the simulation unit 134 supplies the simulation result to the overturning possibility determining unit 135. Depending on the result of the physical simulation, the overturning possibility determining unit 135 determines whether there is the possibility of overturning.

Figure 15A:
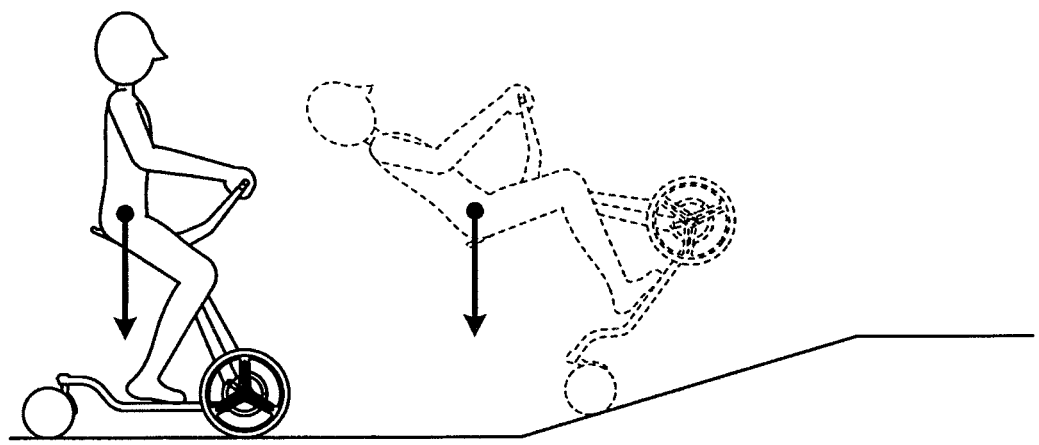
FIGS. 15A and 15B are views illustrating a prediction of the possibility of overturning in accordance with a state of the moving body in another modified example of the embodiment.
Figure 15B:
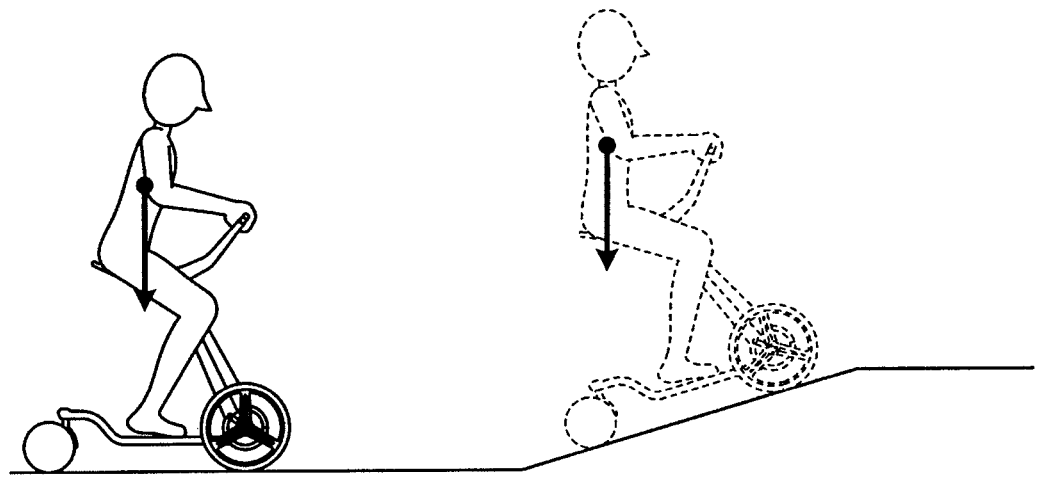

For example, in a scene in which the moving body 1 travels an uphill road as illustrated in FIGS. 15A and 15B, whether there is the possibility of overturning may vary depending on the center of gravity of the occupant. FIGS. 15A and 15B are views illustrating a prediction of the possibility of overturning in accordance with a state of the moving body 1. That is, as illustrated in FIG. 15A, when the center of gravity is placed at the rear side as the occupant is seated deep on the seat 11, the center of gravity of the virtual moving body is also placed at the rear side, and as a result, it is predicted that the virtual moving body will overturn rearward when the virtual moving body travels the uphill road. In this case, assuming that there is the possibility of overturning, the occupant is warned or provided with feedback regarding a speed limit. Meanwhile, as illustrated in FIG. 15B, when the center of gravity is placed at the front side as the occupant slouches down, the center of gravity of the virtual moving body is also placed at the front side, and as a result, it is predicted that the virtual moving body may travel the uphill road without overturning. That is, it is determined that there is no possibility of overturning.

In this way, by applying the movement of the center of gravity, which is caused by a change in seating state or posture of the occupant, to the virtual moving body, it is possible to predict, with high precision, the possibility of overturning based on the entire center of gravity that always changes when the moving body travels. That is, by applying the center of gravity of the occupant, as a load state of the virtual moving body, to the physical simulation on the virtual moving body, it is possible to determine the possibility of overturning with higher precision and thus to provide the occupant with appropriate feedback suitable for the situation. For this reason, it is possible to provide the occupant with the more convenient and highly safe moving body without excessively applying a safety function and without determining a location where the moving body cannot travel naturally as a location where the moving body may travel.

Figure 16A:
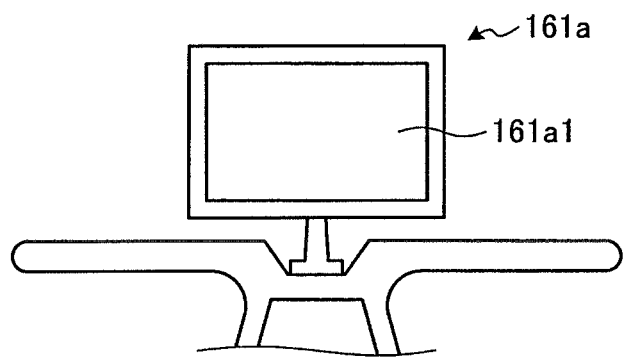
FIGS. 16A and 16B are views illustrating a configuration of a display device in another modified example of the embodiment.
Figure 16B:
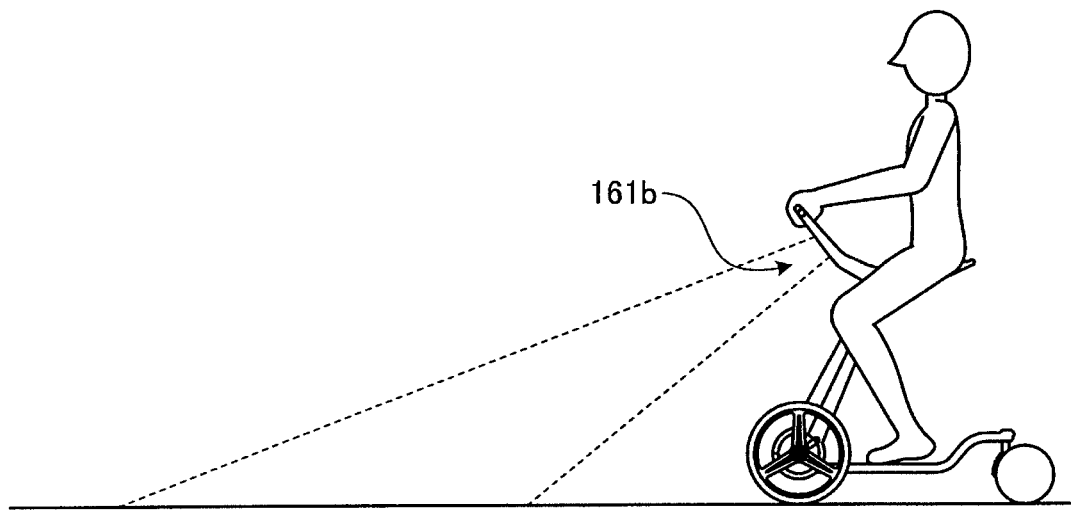

In the embodiment, the example in which the display device 161 is the display lamp is described, but the display device 161 may have other forms. For example, as illustrated in FIG. 16A, the display device 161 is a monitor 161a having a screen 161a1, and when the display device 161 receives a warning display command, the display device 161 displays, on the screen 161a1, a portion causing the possibility of overturning on the virtual road surface so that the portion causing the possibility of overturning is distinguishable from the road surface or the virtual road surface. Alternatively, as illustrated in FIG. 16B, the display device 161 is a projector 161b capable of projecting an image on the road surface, and when the display device 161 receives a warning display command, the display device 161 displays, on the road surface, a portion causing the possibility of overturning on the virtual road surface so that the portion causing the possibility of overturning is distinguishable from the road surface. Alternatively, although not illustrated, the display device 161 may have other forms such as a head-mounted display. FIGS. 16A and 16B are views illustrating a configuration of the display device 161.

Figure 17A:
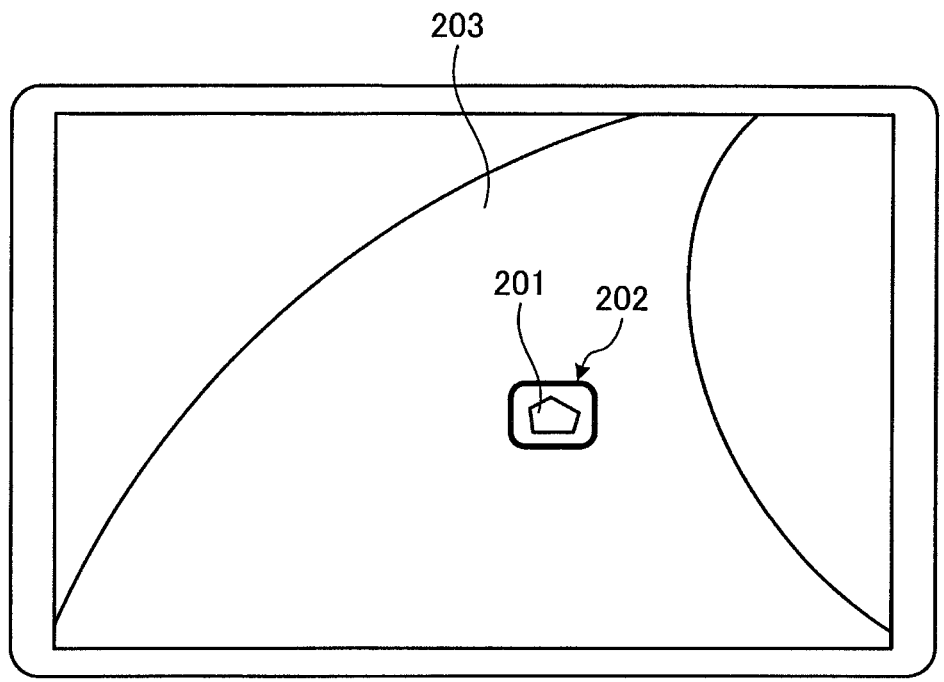
FIGS. 17A and 17B are views illustrating an operation of the display device in another modified example of the embodiment.
Figure 17B:
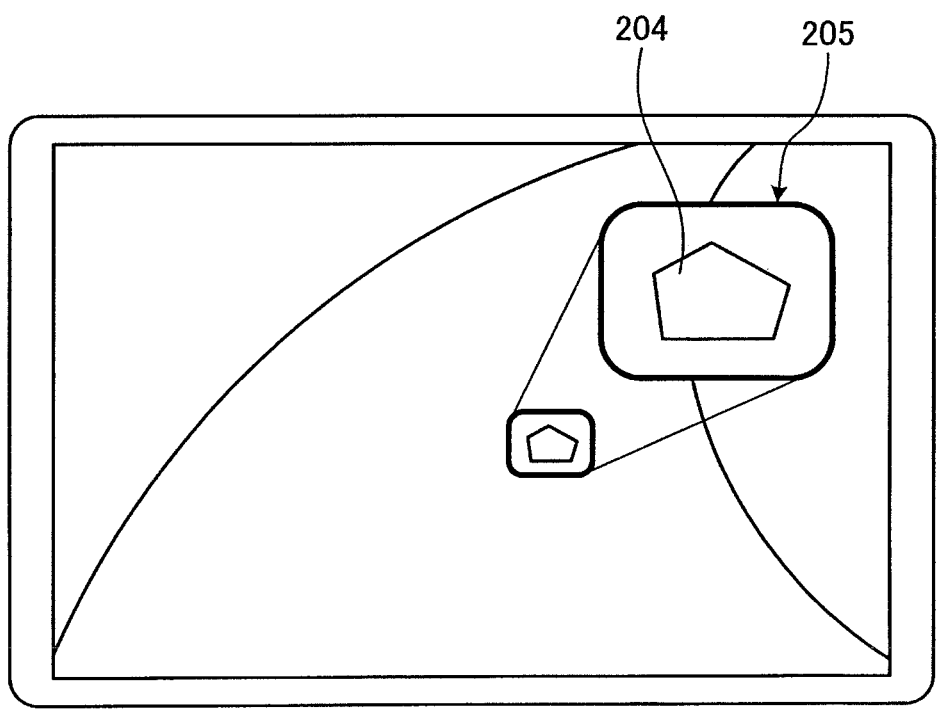
Figure 18A:
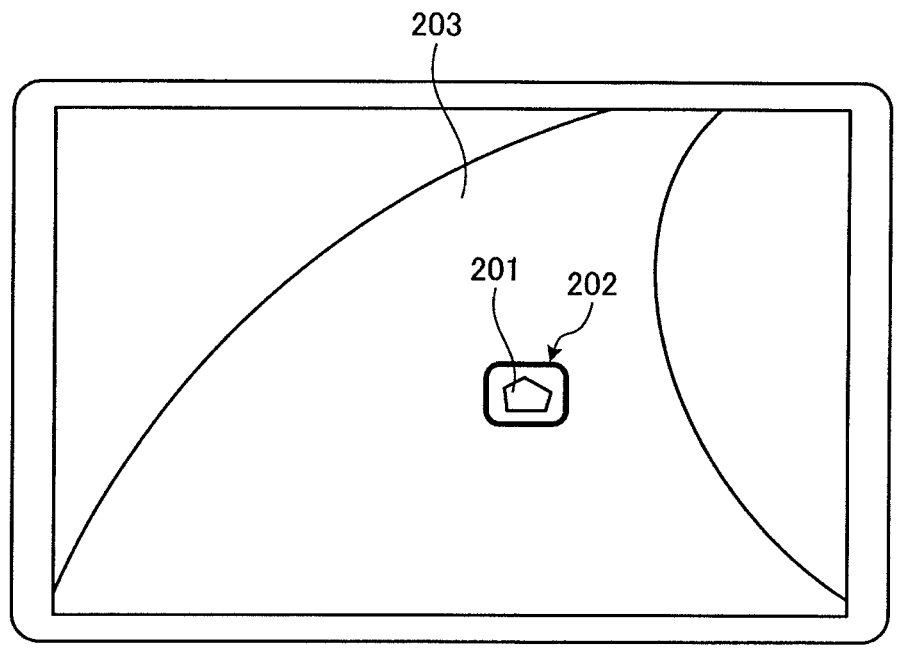
FIGS. 18A and 18B are views illustrating an operation of the display device in another modified example of the embodiment.
Figure 18B:
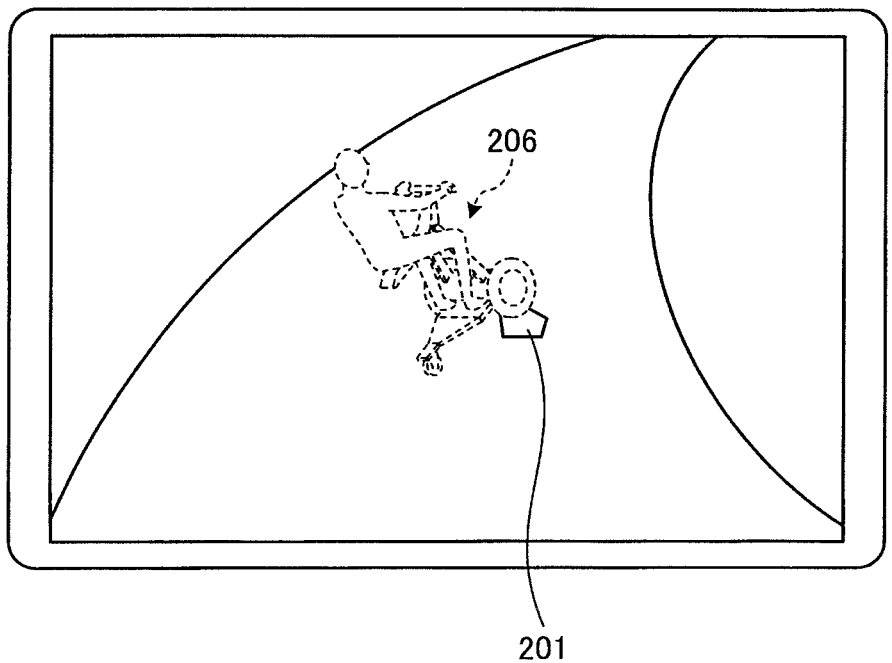

For example, in the case in which the display device 161 is the monitor 161a, in a scene in which a large stone, which causes the overturning, is placed on the road surface at the front side, as illustrated in FIG. 17A, an image 201 of the stone is displayed on an image 203 of the actual road surface or the virtual road surface on the screen 161a1, and a frame object 202, which indicates that the stone is the portion causing the possibility of overturning, is displayed on the screen 161a1. Further, as illustrated in FIG. 17B, an enlarged image 204 of the stone and an enlarged frame object 205 may be displayed. Alternatively, instead of the frame object 202 illustrated in FIG. 18A, an image 206, which indicates the possibility of overturning of the virtual moving body, may be displayed in the vicinity of the image 201 of the stone, as illustrated in FIG. 18B. FIGS. 17A to 18B are views illustrating an operation of the display device 161.

In this way, since the display device 161 is configured as the interface for intelligibly informing of the possibility of overturning, it is possible to intelligibly inform the occupant of the cause (basis) of the possibility of overturning. Therefore, the sense of safety is further imparted to the occupant, and the occupant is informed of the seating state of the occupant that allows the occupant to more safely drive the moving body, so that the occupant may avoid the overturning (the occupant may know a future accident and may cope with the accident. That is, it is possible to prompt the occupant to drive the moving body to avoid the portion causing the possibility of overturning (e.g., stone).

Figure 19:
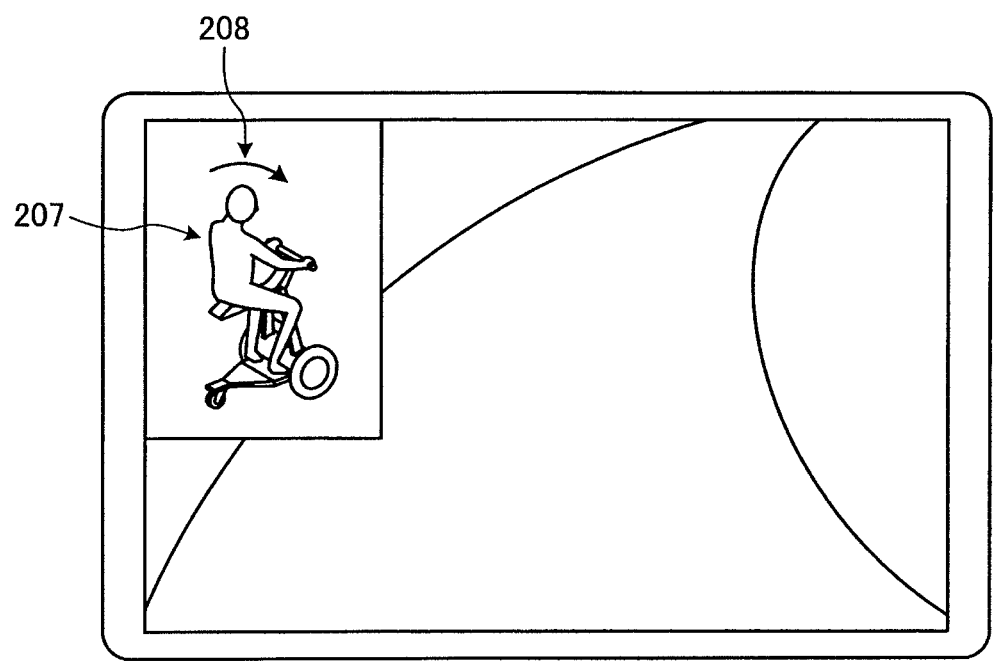
FIG. 19 is a view illustrating an operation of the display device in another modified example of the embodiment.

In the case in which the display device 161 is the monitor 161a, an image 207, which indicates the posture of the occupant, may be displayed or an arrow object 208, which prompts the occupant to improve a riding posture, may also be displayed, as illustrated in FIG. 19. Therefore, it is possible to prompt the occupant to reduce the possibility of overturning of the moving body caused by the riding posture. FIG. 19 is a view illustrating an operation of the display device 161.

Figure 20:
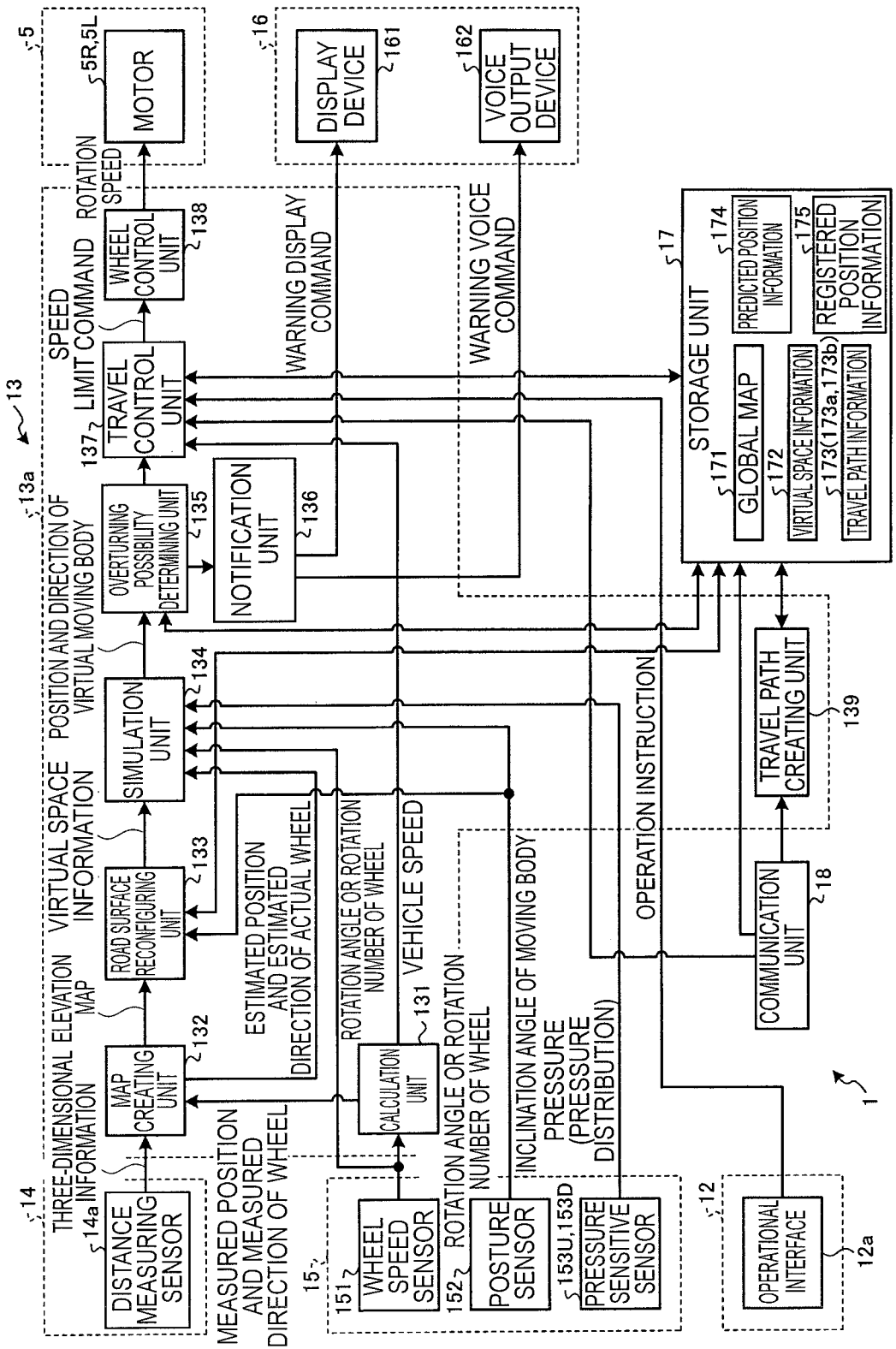
FIG. 20 is a diagram illustrating a functional configuration of the moving body according to another modified example of the embodiment.

Alternatively, the moving body 1 may have a driving operation mode (first mode) in which the moving body 1 travels by receiving the operation instruction, and an autonomous operation mode (second mode) in which the moving body 1 autonomously travels. In this case, the moving body 1 is configured, for example, as illustrated in FIG. 20. FIG. 20 is a diagram illustrating a functional configuration of the moving body 1 in another modified example of the embodiment. The electronic control device 13a of the control unit 13 further has a travel path creating unit 139. The moving body 1 further has a storage unit 17 and a communication unit 18. A global map 171, which is map information including a path which is a candidate for performing an autonomous travel, is stored in advance in the storage unit 17. In addition, virtual space information 172 created by the road surface reconfiguring unit 133 may be stored.

For example, when the travel control unit 137 receives, from the operational interface 12a, an operation instruction intended to perform an operation in the autonomous operation mode, the travel control unit 137 switches an operation mode of the moving body 1 from the driving operation mode to the autonomous operation mode. The travel control unit 137 controls the respective parts in the autonomous operation mode until the travel control unit 137 receives, from the operational interface 12a, an operation instruction intended to release the autonomous operation mode.

In the autonomous operation mode, the communication unit 18 has a global navigation satellite system (GNSS) receiver and supplies the travel path creating unit 139 with position information of the moving body 1 received from the GNSS receiver. The travel path creating unit 139 acquires the global map 171 with reference to the storage unit 17, and as illustrated in FIG. 21A, the travel path creating unit 139 specifies the position of the moving body 1 on the global map 171 and maps the position of the moving body 1 as a start point SP1. Depending on the information of a destination registered in advance or received in advance from the occupant via the operational interface 12a, the travel path creating unit 139 specifies the position on the global map 171 and maps the position as an objective point TP1. The travel path creating unit 139 calculates a path from the start point SP1 to the objective point TP1, creates travel path information 173 that indicates a calculated path RT1, and stores the travel path information 173 in the storage unit 17. Further, the travel control unit 137 controls the respective parts to perform the autonomous travel while specifying the current position of the moving body 1 referring to the global map 171 and the travel path information 173 and based on the position information received from the communication unit (GNSS receiver) 18.

When the moving body 1 starts the autonomous travel along the path RT1, the moving body 1 operates similarly to the operations in S1 to S7 illustrated in FIG. 4. For example, the moving body 1 allows the virtual moving body to travel in the virtual space along the path RT1 prior to the travel of the actual moving body (S4). As illustrated in FIG. 21B, in a case in which it is determined, that there is the possibility of overturning of the virtual moving body in the virtual space at a caution point CP1 indicated by being surrounded by the broken line in FIG. 21A in the path RT1 (Yes in S5), the moving body 1 performs the operation of autonomously avoiding the portion causing the possibility of overturning (S6). That is, as illustrated in FIG. 21C, the moving body 1 recalculates a path that avoids the portion causing the possibility of overturning of the virtual moving body in the virtual space, and the moving body 1 allows the virtual moving body to travel in the virtual space again along a path RT1a after the recalculation prior to the travel of the actual moving body (S4) and determines the possibility of overturning (S5).

When it is determined that there is no possibility of overturning of the virtual moving body in the virtual space at the caution point CP1 (No in S5), the moving body 1 assumes that the safety of the path RT1a is confirmed, and the moving body 1 creates travel path information 173a indicating the recalculated path RT1a and stores the travel path information 173a in the storage unit 17. In this case, the moving body 1 stores the travel path information 173a in the travel path information 173 in an overwrite manner. Therefore, referring to the travel path information 173a instead of the travel path information 173, the moving body 1 may control the respective parts in order to perform the autonomous travel.

Figures 22A, 22B, 22C, 22D:
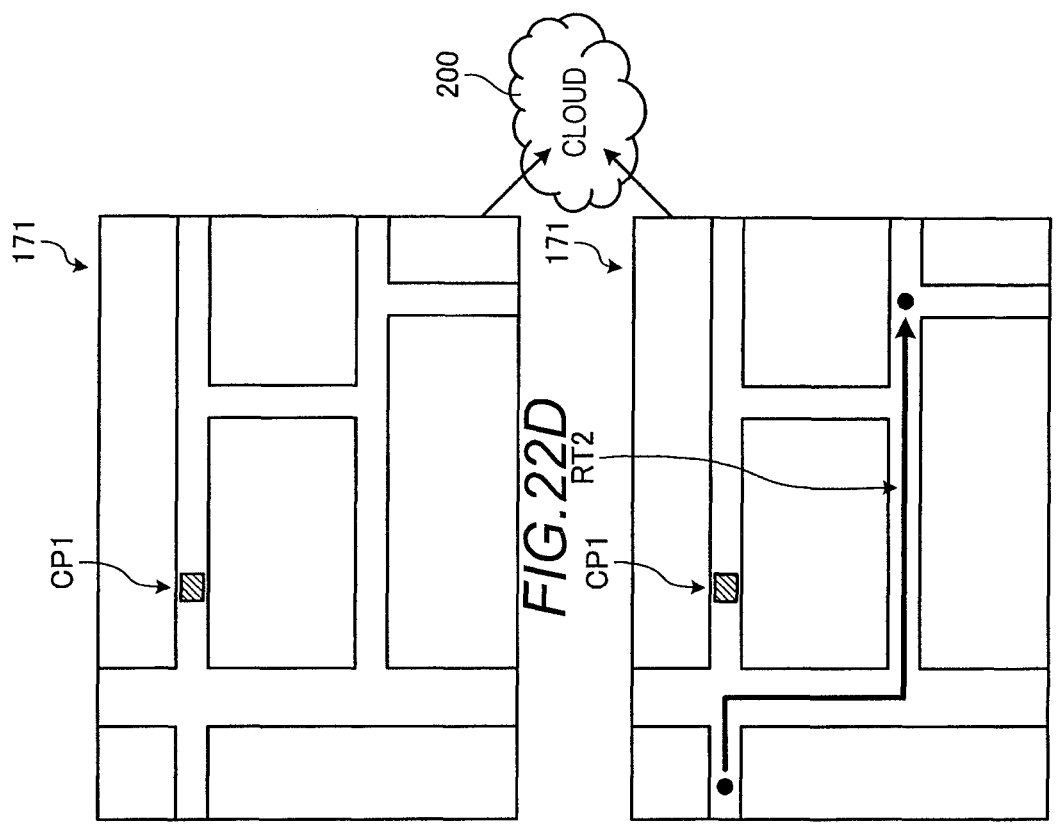
FIGS. 22A to 22D are views illustrating a process of recreating a route in another modified example of the embodiment.

In a case in which it is determined that there is the possibility of overturning of the virtual moving body in the virtual space even along the path RT1a after the recalculation (Yes in S5), or at a point in time at which it is assumed that there is the possibility of overturning at the caution point CP1 on the path RT1 without the recalculation (Yes in S5), the moving body 1 obtains another route that avoids the portion (e.g., the caution point CP1 illustrated in FIGS. 22A and 22B) causing the possibility of overturning, and performs the operation of the autonomous travel along the route (S6). That is, as illustrated in FIGS. 22C and 22D, the moving body 1 recalculates a path that avoids the portion causing the possibility of overturning of the virtual moving body in the virtual space, and the moving body 1 allows the virtual moving body to travel in the virtual space again along a path RT2 after the recalculation prior to the travel of the actual moving body (S4) and determines the possibility of overturning (S5).

When it is determined that there is no possibility of overturning of the virtual moving body in the virtual space at the respective points in the path RT2 after the recalculation (No in S5), the moving body 1 assumes that the safety of the path RT2 is confirmed, and the moving body 1 creates travel path information 173b indicating the recalculated path RT2 and stores the travel path information 173b in the storage unit 17. In this case, the moving body 1 stores the travel path information 173b in the travel path information 173 in an overwrite manner. Therefore, referring to the travel path information 173b instead of the travel path information 173 (or the travel path information 173a), the moving body 1 may control the respective parts in order to perform the autonomous travel.

Therefore, the moving body checks the safety of the road on which the moving body travels while traveling during the autonomous travel, and the moving body autonomously corrects and travels, through the simulation, the travel path depending on the result that may happen, in the near future, to the autonomously traveling main body, and as a result, it is possible to improve safety of the autonomous travel.

The moving body 1 may store the position information of the caution point CP1 in predicted position information 174 predicted as the position at which the possibility of overturning is present. In addition, the moving body 1 uploads and registers the position information of the caution point CP1, as registered position information, in a cloud computer (server on the Internet) 200 via a communication line (wireless line and/or wired line) from the communication unit 18. In addition, the moving body 1 accesses the cloud computer (server on the Internet) 200 via the communication line (wireless line and/or wired line) from the communication unit 18, acquires registered position information 175 uploaded by another moving body 1, and stores the registered position information 175 in the storage unit 17. Therefore, when the moving body 1 calculates the path of the autonomous travel, the moving body 1 may calculate the path while avoiding the position at which the possibility of overturning is present (the position indicated as the registered position information 175).

Based on the simulation result when the occupant is seated on the moving body 1 and drives the moving body 1 in the driving operation mode, an unsafe location (even though the unsafe location may be avoided by the operation of the person) may be specified by a level according to the unsafety by using satellite information such as GPS or narrow area communication such as WiFi.

A control processing program executed by the control unit 13 of the present embodiment may be provided by being recorded, as an installable or executable file, on a computer-readable recording medium such as a CD-ROM, a flexible disk (FD), a CD-R, and a digital versatile disk (DVD).

The control processing program may be stored in a computer connected to a network such as the Internet and may be provided by being downloaded via the network. In addition, the control processing program executed in the present embodiment may be configured to be provided or distributed via the network such as the Internet.

While several embodiments of the present disclosure have been described, the embodiments are proposed as examples but not intended to limit the scope of the disclosure. The novel embodiments may be carried out in other various forms, and may be variously omitted, substituted, and changed without departing from the subject matter of the disclosure. The embodiments and the modifications thereof are included in the scope and the subject matter of the disclosure and also included in the disclosure disclosed in the claims and the equivalent thereto.

A moving body according to an aspect of this disclosure is directed, for example, a moving body including: a first detection unit configured to detect three-dimensional information on a space in which the moving body travels; a second detection unit configured to detect a state of the moving body; and a control unit configured to predict a possibility of overturning of a virtual moving body by allowing the virtual moving body corresponding to the moving body to travel on a virtual road surface in a virtual space prior to a travel of the moving body on a road surface based on a shape of the virtual road surface in the virtual space corresponding to the detected three-dimensional information and based on the detected state of the moving body, and performs control depending on the predicted possibility of overturning. With this configuration, it is possible to predict the possibility of overturning with high precision and appropriately perform a control in accordance with the predicted possibility of overturning.

In the moving body according to the aspect, for example, the detected state of the moving body may include at least one of a proceeding direction of the moving body, posture of the moving body, a position of a center of gravity of the moving body, a speed of the moving body, an acceleration of the moving body, a load state of the moving body, and a grounded state of the moving body. With this configuration, it is possible to predict the possibility of overturning with high precision.

In the moving body according to the aspect, for example, when there is the possibility of overturning, the control unit may notify a warning of the possibility of overturning. With this configuration, it is possible to prompt an occupant of the moving body to perform an appropriate operation in accordance with the predicted possibility of overturning.

In the moving body according to the aspect, for example, when there is the possibility of overturning, the control unit may display, on a display device or the road surface, a portion causing the possibility of overturning on the virtual road surface so as to be distinguishable from the road surface or the virtual road surface. With this configuration, it is possible to prompt an occupant of the moving body to perform an appropriate operation in accordance with the predicted possibility of overturning.

In the moving body according to the aspect, for example, when there is the possibility of overturning, the control unit may limit a travel speed of the moving body. With this configuration, it is possible to appropriately perform control in accordance with the predicted possibility of overturning.

In the moving body according to the aspect, for example, when there is the possibility of overturning, the control unit may control the travel of the moving body so as to avoid a portion on the road surface that corresponds to the portion causing the possibility of overturning on the virtual road surface. With this configuration, it is possible to avoid the overturning of the moving body.

In the moving body according to the aspect, for example, the control unit may have a first mode in which the control unit causes the moving body to travel by receiving an operation instruction, and a second mode in which the control unit performs autonomous travel of the moving body, and in the second mode, when there is the possibility of overturning while performing the autonomous travel of the moving body along a first route, the control unit may obtain a second route for avoiding the portion causing the possibility of overturning on the virtual road surface, and perform the autonomous travel of the moving body along the second route instead of the first route. With this configuration, it is possible to avoid the overturning of the moving body.

In the moving body according to the aspect may further include, for example, a storage unit, when there is the possibility of overturning, the control unit may acquire predicted position information predicted as a position at which the possibility of overturning is present, store the predicted position information in the storage unit, and predict the possibility of overturning of the virtual moving body based on the shape of the virtual road surface in the virtual space created by the detected space, the detected state of the moving body, and the stored predicted position information. With this configuration, it is possible to predict the possibility of overturning with high precision.

In the moving body according to the aspect may further include, for example, a storage unit, the control unit may acquire registered position information registered in advance as a position at which the possibility of overturning is present, store the registered position information in the storage unit, and predict the possibility of overturning of the virtual moving body based on the shape of the virtual road surface in the virtual space created by the detected space, the detected state of the moving body, and the stored registered position information. With this configuration, it is possible to predict the possibility of overturning with high precision.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A moving body comprising:
   a first detection unit configured to detect three-dimensional information on a space in which the moving body travels;
   a second detection unit configured to detect a state of the moving body; and
   a control unit configured to predict a possibility of overturning of a virtual moving body by allowing the virtual moving body corresponding to the moving body to travel on a virtual road surface in a virtual space prior to a travel of the moving body on a road surface based on a shape of the virtual road surface in the virtual space corresponding to the detected three-dimensional information and based on the detected state of the moving body, and performs control depending on the predicted possibility of overturning,
   wherein the control unit includes a map creation unit configured to estimate a position in real time in accordance with movement of the moving body,
   wherein the map creation unit is configured to create an elevation map indicating a distribution of unevenness of a road surface,
   wherein the second detection unit includes a posture sensor configured to detect an inclination angle indicative of a posture of the moving body,
   wherein the control unit further includes a road surface reconfiguring unit configured to reconfigure the elevation map depending on the detected inclination angle,
   wherein the first detection unit detects three-dimensional coordinates of a point group at a periphery of a front side of the moving body and supplies the three-dimensional coordinates to the control unit, and
   wherein the control unit creates lattices corresponding to the point group and creates a mesh based on the lattices, the mesh corresponding to the virtual space.

2. The moving body according to claim 1,
   wherein the detected state of the moving body includes at least one of a proceeding direction of the moving body, posture of the moving body, a position of a center of gravity of the moving body, a speed of the moving body, an acceleration of the moving body, a load state of the moving body, and a grounded state of the moving body.

3. The moving body according to claim 1,
   wherein when there is the possibility of overturning, the control unit notifies a warning of the possibility of overturning.

4. The moving body according to claim 1,
wherein when there is the possibility of overturning, the control unit displays, on a display device or the road surface, a portion causing the possibility of overturning on the virtual road surface so as to be distinguishable from the road surface or the virtual road surface.

5. The moving body according to claim 1,
wherein when there is the possibility of overturning, the control unit limits a travel speed of the moving body.

6. The moving body according to claim 1,
wherein when there is the possibility of overturning, the control unit controls the travel of the moving body so as to avoid a portion on the road surface that corresponds to a portion causing the possibility of overturning on the virtual road surface.

7. The moving body according to claim 1,
wherein the control unit has a first mode in which the control unit causes the moving body to travel by receiving an operation instruction, and a second mode in which the control unit performs autonomous travel of the moving body, and in the second mode, when there is the possibility of overturning while performing the autonomous travel of the moving body along a first route, the control unit obtains a second route for avoiding a portion causing the possibility of overturning on the virtual road surface, and performs the autonomous travel of the moving body along the second route instead of the first route.

8. The moving body according to claim 1, further comprising:
a storage unit,
wherein when there is the possibility of overturning, the control unit acquires predicted position information predicted as a position at which the possibility of overturning is present, stores the predicted position information in the storage unit, and predicts the possibility of overturning of the virtual moving body based on the shape of the virtual road surface in the virtual space created by the detected space, the detected state of the moving body, and the stored predicted position information.

9. The moving body according to claim 1, further comprising:
a storage unit,
wherein the control unit acquires registered position information registered in advance as a position at which the possibility of overturning is present, stores the registered position information in the storage unit, and predicts the possibility of overturning of the virtual moving body based on the shape of the virtual road surface in the virtual space created by the detected space, the detected state of the moving body, and the stored registered position information.

10. The moving body according to claim 1,
wherein the first detection unit includes a distance measuring sensor configured to scan a plane at the front side of the moving body and to radially output laser beams, and
wherein the distance measuring sensor is configured to detect information on a three-dimensional distance to a surface at the front side of the moving body.

11. The moving body according to claim 10,
wherein the distance measuring sensor is configured to detect the information on the three-dimensional distance based on a time of flight principle that detects a distance of a road surface reflecting the laser beams in a measurement direction at any point in time, depending on angles at which the laser beams are emitted and depending on time required until the laser beams are reflected after the laser beams are emitted.

12. The moving body according to claim 1,
wherein the moving body further comprises a frame and wheels disposed to rotate with respect to the frame, and
wherein the second detection unit further includes wheel rotation sensors configured to detect an amount of rotation of the wheel or a rotation rate of the wheels.

13. The moving body according to claim 12,
wherein each of the wheel rotation sensors includes an encoder associated with a respective one of the wheels, and
wherein the posture sensor is a gyroscopic sensor configured to detect a pitch angle indicating an inclination about a Y direction, and a roll angle indicating an inclination in a Y-Z plane.

14. The moving body according to claim 1,
wherein the control unit further includes an overturning possibility determining unit configured to predict a possibility of overturning of the moving body, and
wherein the control unit further includes a notification unit configured to provide a notification of the possibility of overturning of the moving body.

15. The moving body according to claim 14,
wherein the moving body further comprises a frame, wheels disposed to rotate with respect to the frame, and motors configured to rotate the wheels,
wherein the control unit further includes a travel control unit configured to create a speed limit command, and
wherein the control unit further includes a wheel control unit configured to decrease speed of the motors based on the speed limit command.

16. The moving body according to claim 1,
wherein the moving body further comprises
a frame,
wheels disposed to rotate with respect to the frame,
a saddle-shaped seat supported above the frame, and
a handle including grip portions configured to be gripped by an individual while the individual is seated on the saddle-shaped seat.

* * * * *